US012794566B2

(12) United States Patent
Hayes et al.

(10) Patent No.: US 12,794,566 B2
(45) Date of Patent: Nov. 10, 2026

(54) ENTANGLEMENT APPARATUS WITH REFLECTORS ON A QUANTUM DEVICE

(71) Applicant: Quantinuum LLC, Broomfield, CO (US)

(72) Inventors: David Hayes, Broomfield, CO (US); Patricia Lee, Louisville, CO (US); Matthew Bohn, Broomfield, CO (US); Adam Ollanik, Boulder, CO (US); Curtis Volin, Marietta, GA (US)

(73) Assignee: Quantinuum LLC, Broomfield, CO (US)

( * ) Notice: Subject to any disclaimer, the term of this patent is extended or adjusted under 35 U.S.C. 154(b) by 216 days.

(21) Appl. No.: 18/826,426

(22) Filed: Sep. 6, 2024

(65) Prior Publication Data

US 2025/0085489 A1 Mar. 13, 2025

Related U.S. Application Data

(60) Provisional application No. 63/581,525, filed on Sep. 8, 2023.

(51) Int. Cl.
*H04B 10/70* (2013.01)
*G02B 6/42* (2006.01)
(Continued)

(52) U.S. Cl.
CPC ........... *H04B 10/70* (2013.01); *G02B 6/4206* (2013.01); *G02B 6/4214* (2013.01); *G06N 10/20* (2022.01); *G06N 10/40* (2022.01)

(58) Field of Classification Search
CPC ........ H04B 10/70; G02B 6/4206–4218; G02B 6/4214; G06N 10/20–80; G06N 10/40
(Continued)

(56) References Cited

U.S. PATENT DOCUMENTS 7,518,120 B2 * 4/2009 Monroe ................. B82Y 10/00 398/183
2004/0131179 A1 * 7/2004 Ichimura ................ H04B 10/70 380/28

(Continued)

FOREIGN PATENT DOCUMENTS

EP 4071675 A1 10/2022

OTHER PUBLICATIONS

Hayes, David Lee, "Remote and Local Entanglement of lons using Protons and Phonons", Thesis—University of Maryland Doctor of Philosophy, 2012, retrieved from the Internet at https://iontrap.umd.edu/wp-content/uploads/2013/10/Hayes_thesis.pdf on Oct. 1, 2024, 214 pages.

(Continued)

*Primary Examiner* — Li Liu
(74) *Attorney, Agent, or Firm* — Alston & Bird LLP

(57) ABSTRACT

Example embodiments provide methods, systems, apparatuses, products and/or the like for reflecting, collecting, entangling, and/or detecting photons generated by quantum objects. In various embodiments a quantum entanglement apparatus is provided. The quantum entanglement apparatus comprising a first reflecting component on a first surface of a first quantum object confinement component, the first reflecting component configured to reflect a first emitted photon emitted by a first quantum object, a first photonic integrated circuit on a first side of the first quantum object confinement component, a first collection component optically coupled to the first photonic integrated circuit, wherein the first collection component is configured to collect the first emitted photon reflected by the first reflecting component, a first detector configured to detect photons traversing a first optical path of the first photonic integrated circuit, and a first filter along the first optical path.

23 Claims, 20 Drawing Sheets

(51) Int. Cl.
*G06N 10/20* (2022.01)
*G06N 10/40* (2022.01)

(58) Field of Classification Search
USPC .............................................. 398/39, 40, 140
See application file for complete search history.

(56) References Cited

U.S. PATENT DOCUMENTS

| | | | | |
|---|---|---|---|---|
| 2013/0308956 | A1* | 11/2013 | Meyers .................. | B82Y 10/00 977/933 |
| 2015/0055961 | A1* | 2/2015 | Meyers .................. | B82Y 10/00 398/140 |
| 2018/0180970 | A1* | 6/2018 | Klotzer ..................... | G02F 3/00 |
| 2022/0270776 | A1* | 8/2022 | Ransford .................. | G02F 3/02 |
| 2022/0327414 | A1* | 10/2022 | Bohn ..................... | G06N 10/40 |
| 2023/0342650 | A1* | 10/2023 | Chen ...................... | H04B 10/70 |

OTHER PUBLICATIONS

Moehring, D. L., et al., "Entanglement of single-atom quantum bits at a distance", Letters, Nature, Sep. 6, 2007, vol. 449, pp. 68-72, retrieved from the Internet at https://deepblue.lib.umich.edu/bitstream/handle/2027.42/62780/nature06118.pdf?sequence=1 on Oct. 1, 2024.
Mttorini, G., et al., "Entanglement of distinguishable quantum memories", Cornell University Online Library Archive, submitted Oct. 13, 2014, retrieved from the Internet at https://arxiv.org/pdf/1409.0907 on Oct. 1, 2014, 5 pages.
Outgoing—ISA/210—International Search Report Mailed on Jan. 28, 2026 for WO Application No. PCT/US24/045486, 3 page(s).
Outgoing Written Opinion of the ISA Mailed on Jan. 28, 2026 for WO Application No. PCT/US24/045486, 10 page (s).

* cited by examiner

ENTANGLEMENT APPARATUS WITH REFLECTORS ON A QUANTUM DEVICE

CROSS-REFERENCE TO RELATED APPLICATIONS

This application claims priority to U.S. Application No. 63/581,525, filed Sep. 8, 2023, the content of which are incorporated herein by reference in its entirety.

TECHNICAL FIELD

Various embodiments relate to apparatuses, systems, and methods relating to photon reflectors and collectors that can be used in quantum computing and other applications for photon detection and entanglement of quantum objects.

BACKGROUND

Entanglement of quantum objects through entanglement of their emitted photons allows entanglement to happen at a distance. However, the entanglement rate may depend on the efficiency of transmitting those emitted photons to the same location. In quantum devices, it is desired to construct devices that efficiently collects and directs the emitted photons for entanglement. However, collecting and directing the photons may cause loss of photons. Through applied effort, ingenuity, and innovation many deficiencies of such systems have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for reflecting, collecting, and/or detecting photons generated by quantum objects. In various embodiments a quantum entanglement apparatus is provided. The quantum entanglement apparatus comprises a first reflecting component disposed on a first surface of a first quantum object confinement component, the first reflecting component configured to reflect a first emitted photon emitted by a first quantum object, a first photonic integrated circuit placed on a first side of the first quantum object confinement component, a first collection component optically coupled to the first photonic integrated circuit, wherein the first collection component is configured to collect the first emitted photon reflected by the first reflecting component, a first detector configured to receive the first collected emitted photon, and a first filter on a first optical path between the first collecting component and the first detector.

According to a first aspect, a quantum entanglement apparatus is provided. In an example embodiment, the quantum entanglement apparatus includes a first collecting component, the first collecting component configured to cause, at least in part, a first emitted photon emitted by a first quantum object to be provided to a first collection path; a second collecting component, the second collecting component configured to cause, at least in part, a second emitted photon emitted by a second quantum object to be provided to a second collection path; and a beam splitter. The beam splitter is optically coupled to the first collection path and the second collection path and is configured to combine the reflected first emitted photon and the second emitted photon; and direct the first emitted photon to a first respective output port of two output ports of the beam splitter and direct the second emitted photon to a second respective output port of the two output ports of the beam splitter. Whether a respective photon exiting either of the two output ports of the beam splitter was emitted by the first quantum object or the second quantum object is undeterminable. A first output port of the two output ports is configured to provide photons to a first optical path and a second output port of the two output ports is configured to provide photons to a second optical path. The first optical path includes a first polarizer and a first detector. The first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer. The second optical path includes a second polarizer and a second detector. The second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer.

In an example embodiment, at least one of the first collecting component or the second collecting component is a reflecting component disposed on a first surface of a respective quantum object confinement component.

In an example embodiment, at least one of the first collecting component or the second collecting component is an optical concentrating element disposed on a respective photonic integrated circuit secured with respect to a first surface of a respective quantum object confinement component.

In an example embodiment, the quantum entanglement apparatus further includes a first waveguide optically coupled to a first input of the beam splitter, the first waveguide configured to convey the reflected first emitted photon to the beam splitter; and a second waveguide optically coupled to a second input of the beam splitter, the second waveguide configured to convey the reflected second emitted photon to the beam splitter.

In an example embodiment, the quantum entanglement apparatus further includes a first photonic integrated circuit disposed on a first side of the first quantum object confinement component, the first photonic integrated circuit comprising one or more of a metasurface component, the beam splitter, the first polarizer, the second polarizer, the first detector, the second detector, the first waveguide, or the second waveguide.

In an example embodiment, the quantum entanglement apparatus further includes a first optical fiber optically coupled to a first input of the beam splitter, the first optical fiber configured to convey the reflected first emitted photon to the beam splitter; and a second optical fiber optically coupled to a second input of the beam splitter, the second optical fiber configured to convey the reflected second emitted photon to the beam splitter.

In an example embodiment, the quantum entanglement apparatus further includes a first photonic integrated circuit disposed on a first side of the first quantum object confinement component, the first photonic integrated circuit comprising one or more of the beam splitter, the first polarizer, the second polarizer, the first detector, the second detector, the first optical fiber, or the second optical fiber.

In an example embodiment, the first photonic integrated circuit further comprises a first collection component configured to collect the reflected first emitted photon and a second collection component configured to collect the reflected second emitted photon.

In an example embodiment, the first collection component comprises at least one of a first refractive lens, a first diffractive lens, or a first metasurface and the second collection component comprises at least one of a second refractive lens, a second diffractive lens, or a second metasurface.

In an example embodiment, the quantum entanglement apparatus further includes a first photonic integrated circuit disposed on a first side of the first quantum object confinement component, the first photonic integrated circuit comprising one or more of the beam splitter, the first polarizer, the second polarizer, the first optical fiber, or the second optical fiber, and wherein at least one of (a) at least one of the first detector or the second detector are disposed on the first photonic integrated circuit or (b) at least one of the first detector or the second detector are disposed adjacent to the first photonic integrated circuit.

In an example embodiment, the quantum entanglement apparatus further includes a first waveguide configured to convey the reflected first emitted photon; a first collection component optically coupled to the first waveguide, the first collection component comprises one or more of a first diffractive lens or a first metasurface configured to collect the reflected first emitted photon; a second waveguide configured to convey the reflected second emitted photon; and a second collection component optically coupled to the second waveguide, the second collection component comprises one or more of a second diffractive lens or a second metasurface configured to collect the reflected second emitted photon.

In an example embodiment, the first collecting component is one of the first collection component or a first reflecting component disposed on a first surface of a first quantum object confinement apparatus, and the second collecting component is one of the second collection component or a second reflecting component disposed on the first surface of the first quantum object confinement apparatus.

In an example embodiment, the quantum entanglement apparatus further includes a first optical fiber optically coupled to the first waveguide and the beam splitter, the first optical fiber configured to convey the collected first emitted photon to the beam splitter; a second optical fiber optically coupled to the second waveguide and the beam splitter, the second optical fiber configured to convey the collected second emitted photon to the beam splitter; a third optical fiber optically coupled to the beam splitter and the first detector, the third optical fiber defining at least a portion of the first optical path; and a fourth optical fiber coupled to the beam splitter and the second detector, the fourth optical fiber defining at least a portion of the second optical path.

In an example embodiment, the quantum entanglement apparatus further includes a first modification component configured to modify one or more of a shape, phase, polarization, amplitude, frequency, or a time delay of photons incident thereon, the first modification component disposed either as part of the first collection path or as part of the first optical path; and a second modification component configured to modify one or more of a shape, phase, polarization, amplitude, frequency, or a time delay of photons incident thereon, the second modification component disposed either as part of the second collection path or as part of the second optical path; wherein the quantum entanglement apparatus is configured to entangle the first quantum object and the second quantum object when the first detector and the second detector detect respective photons simultaneously.

In an example embodiment, the quantum entanglement apparatus further includes a first photonic integrated circuit disposed on a first side of the first quantum object confinement component, the first photonic integrated circuit comprising one or more of the beam splitter, the first polarizer, the second polarizer, the first detector, the second detector, the first waveguide, the second waveguide, the first collection component, and the second collection component, the first optical fiber, the second optical fiber, the third optical fiber, the fourth optical fiber, the first modification component, or the second modification component.

In an example embodiment, the first optical path comprises a first filter, wherein the first filter is at least one of a spatial filter or a frequency domain filter, and the second optical path comprises a second filter, wherein the second filter is at least one of a spatial filter or a frequency domain filter.

According to another aspect, a quantum entanglement apparatus is provided. In an example embodiment, the quantum entanglement apparatus includes a first reflecting component disposed on a first surface of a first quantum object confinement component, the first reflecting component configured to reflect a first emitted photon emitted by a first quantum object; a second reflecting component disposed on the first surface of the first quantum object confinement component, the second reflecting component configured to reflect a second emitted photon emitted by a second quantum object; a first collection component configured to collect the reflected first emitted photon; a first modification component configured to modify one or more of a shape, phase, polarization, amplitude, frequency, and/or a time delay of the collected first emitted photon; a second collection component configured to collect the reflected second emitted photon; and a second modification component configured to modify one or more of a shape, phase, polarization, amplitude, frequency, and/or a time delay of the collected second emitted photon.

In an example embodiment, the quantum entanglement apparatus further includes a beam splitter configured to combine the collected first emitted photon and the collected second emitted photon; and direct the first emitted photon to a first respective output port of two output ports of the beam splitter and direct the second emitted photon to a second respective output port of the two output ports of the beam splitter, wherein whether a respective photon exiting either of the two output ports of the beam splitter was emitted by the first quantum object or the second quantum object is undeterminable.

In an example embodiment, a first output port of the two output ports is configured to provide photons to a first optical path and a second output port of the two output ports is configured to provide photons to a second optical path, and the quantum entanglement apparatus further comprises the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer, wherein the quantum entanglement apparatus is configured to entangle the first quantum object and the second quantum object when the first detector and the second detector respectively detect the first polarized photon and the second polarized photon simultaneously.

In an example embodiment, the quantum entanglement apparatus further includes a first waveguide or optical fiber configured to convey the collected first emitted photon to the beam splitter; and a second waveguide or optical fiber configured to convey the collected second emitted photon to the beam splitter.

In an example embodiment, the quantum entanglement apparatus further includes a third waveguide or optical fiber defining at least a portion of the first optical path; and a fourth waveguide or optical fiber defining at least a portion of the second optical path.

In an example embodiment, the first polarizer is coupled to the third waveguide or optical fiber and the second polarizer is coupled to the fourth waveguide or optical fiber.

In an example embodiment, the first collection component is optically coupled to the first waveguide or optical fiber, and the second collection component is optically coupled to the second waveguide or optical fiber.

In an example embodiment, the first collection component is integral to the first waveguide or optical fiber, and the second collection component is integral to the second waveguide or optical fiber.

In an example embodiment, quantum entanglement apparatus further includes a first photonic integrated circuit disposed on the first side of the first quantum object confinement component, the first photonic integrated circuit comprising one or more of the beam splitter, the first polarizer, the second polarizer, the first detector, the second detector, the first waveguide or optical fiber, the second waveguide or optical fiber, the third waveguide or optical fiber, the fourth waveguide or optical fiber, the first collection component, the second collection component, the first modification component, or the second modification component.

According to another aspect, a quantum entanglement apparatus is provided. In an example embodiment, the quantum entanglement apparatus further includes a first reflecting component disposed on a first surface of a first quantum object confinement component, the first reflecting component configured to reflect a first emitted photon emitted by a first quantum object; a second reflecting component disposed on the first surface of the first quantum object confinement component, the second reflecting component configured to reflect a second emitted photon emitted by a second quantum object; a first photonic integrated circuit disposed on the first side of the first quantum object confinement component; a first collection component optically coupled to the first photonic integrated circuit, wherein the first collection component is configured to collect the reflected first emitted photon into a respective optical path of the first photonic integrated circuit; a second photonic integrated circuit disposed on the first side of the first quantum object confinement component; and a second collection component optically coupled to the second photonic integrated circuit, wherein the second collection component is configured to collect the reflected second emitted photon into a respective optical path of the first photonic integrated circuit.

In an example embodiment, the quantum entanglement apparatus further includes a beam splitter configured to combine the first emitted photon and the second emitted photon; and direct the first emitted photon to a first respective output port of two output ports of the beam splitter and direct the second emitted photon to a second respective output port of the two output ports of the beam splitter, wherein whether a respective photon exiting either of the two output ports of the beam splitter was emitted by the first quantum object or the second quantum object is undeterminable.

In an example embodiment, a first output port of the two output ports is configured to provide photons to a first optical path and a second output port of the two output ports is configured to provide photons to a second optical path, and the quantum entanglement apparatus further comprises the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer, wherein the quantum entanglement apparatus is configured to entangle the first quantum object and the second quantum object when the first detector and the second detector respectively detect the first polarized photon and the second polarized photon simultaneously.

In an example embodiment, the quantum entanglement apparatus further includes a first waveguide or optical fiber configured to convey the collected first emitted photon to the beam splitter; and a second waveguide or optical fiber configured to convey the collected second emitted photon to the beam splitter.

In an example embodiment, the quantum entanglement apparatus further includes a third waveguide or optical fiber defining at least a portion of the first optical path; and a fourth waveguide or optical fiber defining at least a portion of the second optical path.

In an example embodiment, the first polarizer is coupled to the third waveguide or optical fiber and the second polarizer is coupled to the fourth waveguide or optical fiber.

In an example embodiment, the first collection component is optically coupled to the first waveguide or optical fiber, and the second collection component is optically coupled to the second waveguide or optical fiber.

In an example embodiment, the first collection component is integral to the first waveguide or optical fiber, and the second collection component is integral to the second waveguide or optical fiber.

According to still another aspect, a quantum entanglement apparatus is provided. In an example embodiment, the quantum entanglement apparatus includes a first reflecting component disposed on a first surface of a first quantum object confinement component, the first reflecting component configured to reflect a first emitted photon emitted by a first quantum object; a second reflecting component disposed on a second surface of the first quantum object confinement component, the second reflecting component configured to reflect a second emitted photon emitted by a second quantum object; a first collection component configured to collect the reflected first emitted photon; a second collection component configured to collect the reflected second emitted photon; a beam splitter configured to combine the reflected first emitted photon and the second emitted photon; and direct the first emitted photon to a first respective output port of two output ports of the beam splitter and direct the second emitted photon to a second respective output port of the two output ports of the beam splitter, wherein whether a respective photon exiting either of the two output ports of the beam splitter was emitted by the first quantum object or the second quantum object is undeterminable, and wherein a first output port of the two output ports is configured to provide photons to a first optical path and a second output port of the two output ports is configured to provide photons to a second optical path; the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer.

In an example embodiment, the quantum entanglement apparatus further includes a first waveguide or optical fiber configured to convey the collected first emitted photon to the beam splitter; and a second waveguide or optical fiber configured to convey the collected second emitted photon to the beam splitter.

In an example embodiment, the quantum entanglement apparatus further includes a third waveguide or optical fiber defining at least a portion of the first optical path; and a fourth waveguide or optical fiber defining at least a portion of the second optical path.

In an example embodiment, the first polarizer is coupled to the third waveguide or optical fiber and the second polarizer is coupled to the fourth waveguide or optical fiber.

In an example embodiment, the first collection component is optically coupled to the first waveguide or optical fiber, and the second collection component is optically coupled to the second waveguide or optical fiber.

In an example embodiment, the first collection component is integral to the first waveguide or optical fiber, and the second collection component is integral to the second waveguide or optical fiber.

In an example embodiment, the quantum entanglement apparatus further includes a first photonic integrated circuit disposed on the first side of the first quantum object confinement component, the first photonic integrated circuit comprising one or more of the first collection component, the first waveguide or optical fiber, or the first modification component; and a second photonic integrated circuit disposed on the second side of the first quantum object confinement component, the second photonic integrated circuit comprising one or more of the second collection component, the second waveguide or optical fiber, or the second modification component.

According to yet another aspect, a quantum entanglement apparatus is provided. In an example embodiment, the quantum entanglement apparatus includes a first reflecting component disposed on a first surface of a first quantum object confinement component, the first reflecting component configured to reflect a first emitted photon emitted by a first quantum object confined by the first quantum object confinement component; a second reflecting component disposed on a first surface of a second quantum object confinement component, the second reflecting component configured to reflect a second emitted photon emitted by a second quantum object confined by the second quantum object confinement component; a first collection component configured to collect the reflected first emitted photon; a second collection component configured to collect the reflected second emitted photon; a beam splitter configured to combine the reflected first emitted photon and the second emitted photon; and direct the first emitted photon to a first respective output port of two output ports of the beam splitter and direct the second emitted photon to a second respective output port of the two output ports of the beam splitter, wherein whether a respective photon exiting either of the two output ports of the beam splitter was emitted by the first quantum object or the second quantum object is undeterminable, and wherein a first output port of the two output ports is configured to provide photons to a first optical path and a second output port of the two output ports is configured to provide photons to a second optical path; the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer.

In an example embodiment, the quantum entanglement apparatus further includes a first vacuum chamber comprising the first quantum object confinement component; and a second vacuum chamber comprising the second quantum object confinement component.

In an example embodiment, the quantum entanglement apparatus further including a first waveguide or optical fiber configured to convey the collected first emitted photon to the beam splitter; and a second waveguide or optical fiber configured to convey the collected second emitted photon to the beam splitter.

In an example embodiment, the quantum entanglement apparatus further includes a third waveguide or optical fiber defining at least a portion of the first optical fiber; and a fourth waveguide or optical fiber defining at least a portion of the second optical fiber.

In an example embodiment, the first polarizer is coupled to the third waveguide or optical fiber and the second polarizer is coupled to the fourth waveguide or optical fiber.

In an example embodiment, the first collection component is optically coupled to the first waveguide or optical fiber, and the second collection component is optically coupled to the second waveguide or optical fiber.

In an example embodiment, the first collection component is integral to the first waveguide or optical fiber, and the second collection component is integral to the second waveguide or optical fiber.

In an example embodiment, the quantum entanglement apparatus further includes a first photonic integrated circuit placed on the first side of the first quantum object confinement component, the first photonic integrated circuit comprising one or more of the first collection component, the first waveguide or optical fiber, or the first modification component; and a second photonic integrated circuit placed on the first side of the second quantum object confinement component, the second photonic integrated circuit comprising one or more of the second collection component, the second waveguide or optical fiber, or the second modification component.

According to yet another aspect, a quantum entanglement apparatus is provided. In an example embodiment, the quantum entanglement apparatus includes a first quantum object confinement component configured to confine a first quantum object; a second quantum object confinement component configured to confine a second quantum object; a first collection component configured to collect a first emitted photon emitted by the first quantum object; a first modification component configured to modify one or more of a shape, phase, polarization, amplitude, frequency, and/or a time delay of the collected first emitted photon; a second collection component configured to collect a second emitted photon emitted by the second quantum object; a second modification component configured to modify one or more of a shape, phase, polarization, amplitude, frequency, and/or a time delay of the collected second emitted photons; a beam splitter configured to combine the reflected first emitted photon and the second emitted photon; and direct the first emitted photon to a first respective output port of two output ports of the beam splitter and direct the second emitted photon to a second respective output port of the two output ports of the beam splitter, wherein whether a respective photon exiting either of the two output ports of the beam splitter was emitted by the first quantum object or the second quantum object is undeterminable, and wherein a first output port of the two output ports is configured to provide photons to a first optical path and a second output port of the two output ports is configured to provide photons to a second optical path; the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer.

In an example embodiment, the quantum entanglement apparatus further includes a first waveguide or optical fiber configured to convey the collected first emitted photon to the beam splitter; and a second waveguide or optical fiber configured to convey the collected second emitted photon to the beam splitter.

In an example embodiment, the quantum entanglement apparatus further includes a third waveguide or optical fiber defining at least a portion of the first optical path; and a fourth waveguide or optical fiber defining at least a portion of the second optical path.

In an example embodiment, the first polarizer is coupled to the third waveguide or optical fiber and the second polarizer is coupled to the fourth waveguide or optical fiber.

In an example embodiment, the first collection component is optically coupled to the first waveguide or optical fiber, and the second collection component is optically coupled to the second waveguide or optical fiber.

In an example embodiment, the first collection component is integral to the first waveguide or optical fiber, and the second collection component is integral to the second waveguide or optical fiber.

In an example embodiment, the quantum entanglement apparatus further includes a first photonic integrated circuit placed on the first side of the first quantum object confinement component, the first photonic integrated circuit comprising one or more of the beam splitter, the first polarizer, the second polarizer, the first detector, the second detector, the first waveguide or optical fiber, the second waveguide or optical fiber, the third waveguide or optical fiber, the fourth waveguide or optical fiber, the first collection component, the second collection component, the first modification component, or the second modification component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative," "exemplary" and/or "example" are used to be examples with no indication of quality level. The terms "generally," "substantially," "about," and "approximately" refer to within engineering and/or manufacturing tolerances and/or within user measurement capabilities, unless otherwise indicated. Like numbers refer to like elements and/or components throughout.

In various embodiments, methods, apparatuses, systems, and/or the like for collecting, capturing, and/or detecting photons emitted by quantum objects confined by a quantum object confinement apparatus are provided. In various embodiments, the quantum object is a neutral or charged/ionic atom; neutral, charged, or multipole molecule; quantum particle; quantum dot; and/or the like. The quantum object may be a qubit quantum object of a quantum object crystal comprising two or more quantum objects, with, in an example embodiment, the two or more quantum objects comprising quantum objects of at least two different atomic numbers. In an example embodiment, the quantum object confinement apparatus is a trapping apparatus configured to trap and/or confine a plurality of quantum objects.

In conventional photon collection systems, photodetectors are positioned proximate the confinement apparatus such that the photodetectors field of view is at least a portion of the confinement apparatus. However, the photons that are emitted by the quantum object may not all reach the photodetectors. This may reduce the efficiency of the photon collection and detection. Thus, technical problems exist regarding how to efficiently detect fluoresced emission from a quantum object.

Various embodiments provide technical solutions to these technical problems. For example, in various embodiments, a reflecting component on a surface of the quantum object confinement apparatus is provided to redirect the photons to a collection component (e.g., a photodetector or optical element configured to direct the photons toward the photodetector). Using the reflecting component, increases the number of photons that reach the collection component, hence increasing the efficiency of photon collection and detection.

Figure 1:
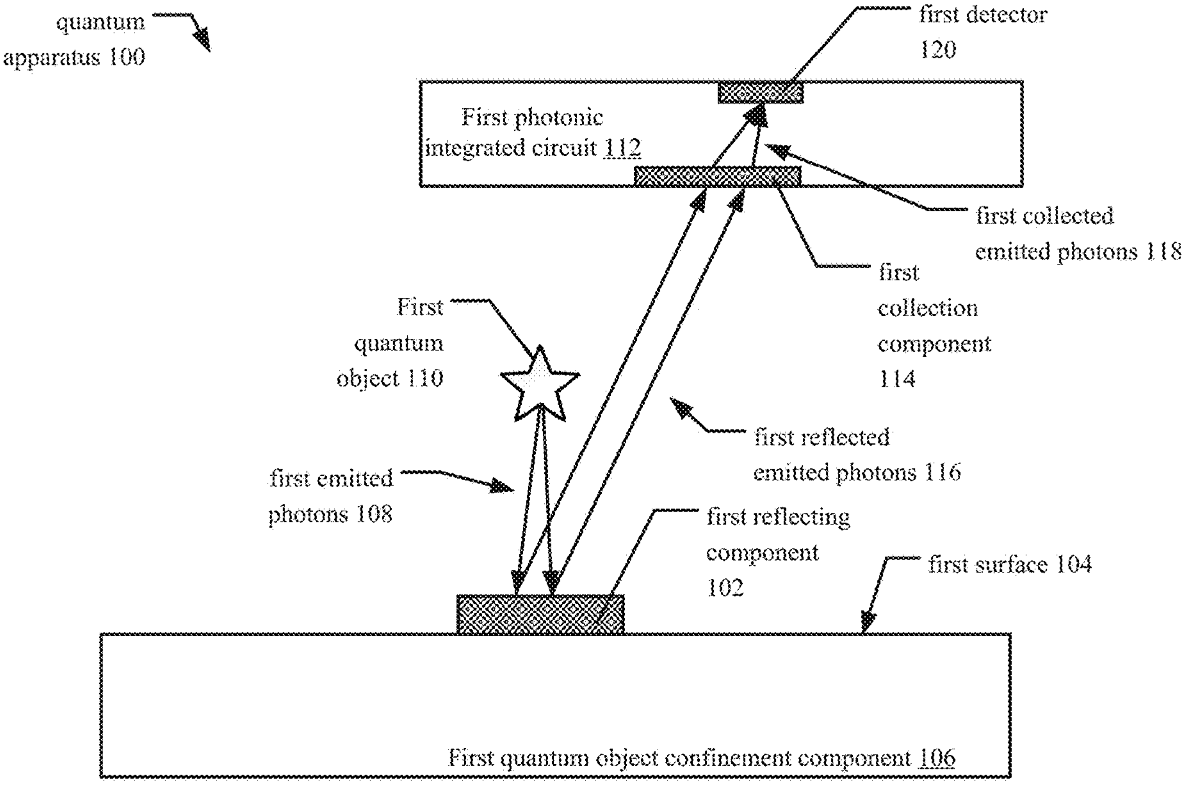
FIG. 1 is a schematic diagram illustrating an example quantum system, according to an example embodiment.

In various embodiments, the quantum system includes a first collecting component configured to cause one or more first photons emitted by a first quantum object to be provided to a first collection path. The first collecting component may be a first reflecting component 102, as shown in FIG. 1 or a first collecting component such as the refractive lens 202 shown in FIG. 2 and/or the first collection component 114 shown in FIG. 3-13. The quantum system 100 may further include a second collecting component configured to cause one or more second photons emitted by a second quantum object to be provided to a second collection path. The second collecting component may be a second reflecting component 702, as shown in FIG. 7A-12, for example, or a second collecting component such as the second collection component 714 shown in FIGS. 7A-13.

The first collection path is configured to provide the first photons to a first detector 120, as shown in FIGS. 1-5, and/or a beam splitter 756 as shown in FIGS. 7A-12. The second collection path is configured to provide the second photons to a second detector and/or to the beam splitter 756. The beam splitter 756 is configured to combine the reflected first emitted photon and the second emitted photon; and direct the first emitted photon to a first respective output port of two output ports of the beam splitter and direct the second emitted photon to a second respective output port of the two output ports of the beam splitter. Whether a respective photon exiting either of the two output ports of the beam splitter was emitted by the first quantum object or the second quantum object is undeterminable. A first output port of the two output ports is configured to provide photons to a first optical path and a second output port of the two output ports is configured to provide photons to a second optical path.

The first optical path provides photons propagating there along to a first detector and the second optical path provides photons propagating there along to a second detector. The detection of photons by the first detector and/or the second detector where it is unknown whether the photons were omitted by the first quantum object or the second quantum object leads to the quantum entanglement of the first quantum object and the second quantum object. This entanglement of the first quantum object and the second quantum object may then be used for performing various quantum experiments, quantum manipulations, quantum state evolutions, and/or the like on the first quantum object and the second quantum object.

FIG. 1 illustrates a schematic diagram of an example quantum system 100 in accordance with an example embodiment. The quantum system 100 may be used in a quantum entanglement apparatus according to various embodiments herein.

In an example embodiment, the quantum system 100 includes a first reflecting component 102 disposed on a first surface 104 of a first quantum object confinement component 106. In various embodiments, the quantum object component may be any of the confinement components and/or methods described in U.S. patent application Ser. No. 17/653,979, the disclosure of which is incorporated herein in its entirety.

In an example embodiment, the first reflecting component 102 reflects first emitted photon(s) 108 emitted by a first quantum object 110 to generate first reflected emitted photon(s) 116. In an example embodiment, the first quantum object 110 is trapped using the first quantum object confinement component 106. In example embodiments, the first reflecting component 102 may include any of a mirror, retroreflectors, corner cubes, array of retroreflectors, metasurface reflectors, and/or any optical component capable of reflecting photons. In example embodiments, a metasurface reflector may include an array of metamaterial structures where each metamaterial structure individually reflects the first emitted photon(s) 108.

In various embodiments, the emitted photon(s) 108 is emitted in response to a reading signal incident on the first quantum object 110 using any of the systems and/or methods described in U.S. patent application Ser. No. 17/583,308 published as U.S. Pre Grant Publication No. 2022/0270776 A1, the disclosure of which is incorporated herein in its entirety.

In example embodiments, a first photonic integrated circuit 112 is placed on a first side of the first quantum object confinement component 106. In various embodiments, a confinement apparatus is define on a first surface 104 of a first quantum object confinement component 106 and the first side of the first quantum object confinement component 106 is adjacent the first surface 104 of the first quantum object confinement component 106. A first collection component 114 may be optically coupled to the first photonic integrated circuit 112. In example embodiments, the photonic integrated circuit, such as the photonic integrated circuit 112 is an integrated optical circuit including one or more optical components. In example embodiments, the photonic integrated circuit such as the photonic integrated circuit 112 is a substrate different from the substrate where the quantum object confinement component such as the quantum object confinement component 106 is formed on. The first collection component 114 may collect the first reflected emitted photon(s) 116 after it is reflected by the first reflecting component 102. For example, the first collection component 114 is configured to couple and/or direct the first reflected emitted photon(s) 116 along a respective optical path. In example embodiments, the first collection component 114 may include any of a refractive lens, a diffractive lens, an aperture, a metasurface lens, and/or any optical component capable of passing photons through. In example embodiments, a metasurface lens may include an array of metamaterial structures where each metamaterial structure individually performs a function on and/or conveys the first reflected emitted photon(s) 116.

In an example embodiment, the first collection component 114 produces a first collected emitted photon(s) 118. In an example embodiment, a first detector 120 receives and/or detects the first collected emitted photon(s) 118. In various embodiments, the first detector 120 is a photodetector such as a photodiode, photomultiplier tube (PMT), charge-coupled device (CCD), Complementary metal-oxide-semiconductor (CMOS) detector, and/or other photon detector. In example embodiments, the first photonic integrated circuit 112 includes a transparent material through which the first collected emitted photon(s) 118 travels to reach the first detector 120. In example embodiments, the first detector 120 is disposed on the first photonic integrated circuit 112.

In various embodiments, using the first reflecting component 102 to reflect the first emitted photon(s) 108 from a quantum object 110 to a first collection component 114 may increase the amount and/or efficiency of the collected photon (s). For example, the first quantum object 110 may be closer to the first surface 104 of the first quantum object confinement component 106 as compared to the first collection component. Using the first reflecting component on the first surface 104 of the first quantum object confinement component 106 may provide for more of the first emitted photon(s) 108 to reach the first collection components 114 and the first detector 120. This may increase the efficiency of a quantum entanglement apparatus using the various components and/or arrangement illustrated by FIG. 1. In various embodiments, the first emitted photon(s) 108 is scattered in all directions from the first quantum object 110. The first collection component may in addition to collecting the first reflected emitted photon(s) 116, also collected the first emitted photon(s) 108 directly from the first quantum object. Various embodiments herein provide high efficiency for photon(s) collection and detection by providing for collection of the first reflected emitted photon(s) 116 and/or also directly collecting the first emitted photon(s) 108 from the first quantum object 110.

Figure 2:
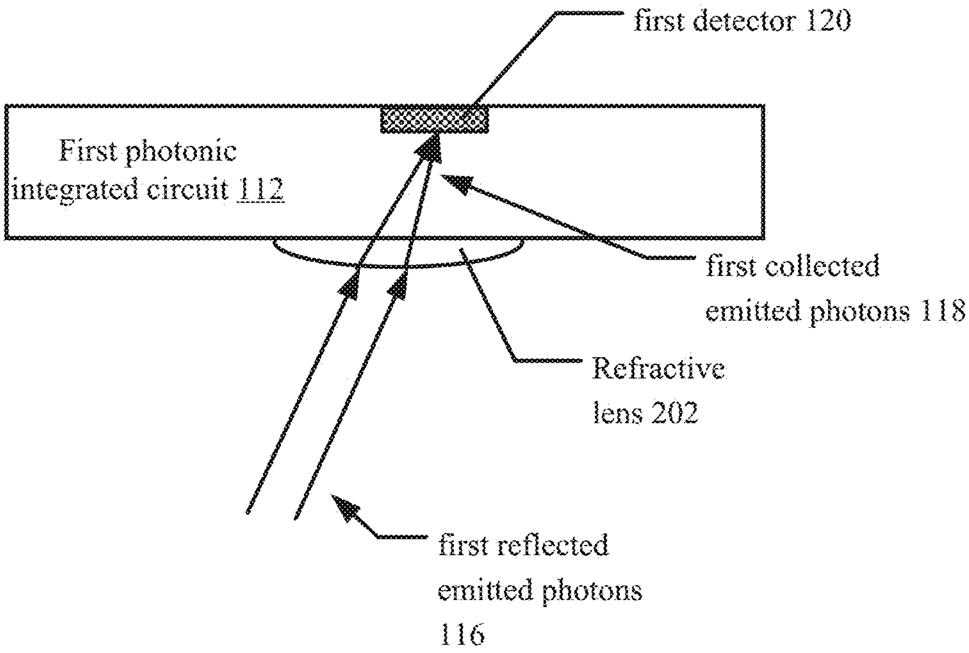
FIG. 2 is a schematic diagram of a portion of a photonic integrated circuit, according to an example embodiment.

FIG. 2 illustrates a schematic diagram of a portion of a photonic integrated circuit, according to an example embodiment herein. In an example embodiment, the first reflected emitted photon(s) 116 is focused on the first detector 120 by a refractive lens 202. In an example embodiment, the refractive lens 202 may be integrated in the first photonic integrated circuit 112. For example, the first photonic integrated circuit 112 and the refractive lens 202 are made from a monolithic refractive material such as glass.

In example embodiments, the first photonic integrated circuit 112 and the refractive lens 202 are separate components. In example embodiments, the first detector 120 may be disposed on the first photonic integrated circuit 112. The first detector 120 may be disposed on an inner surface of the first photonic integrated circuit 112 or may be disposed on an outer surface of the first photonic integrated circuit 112.

Figure 3:
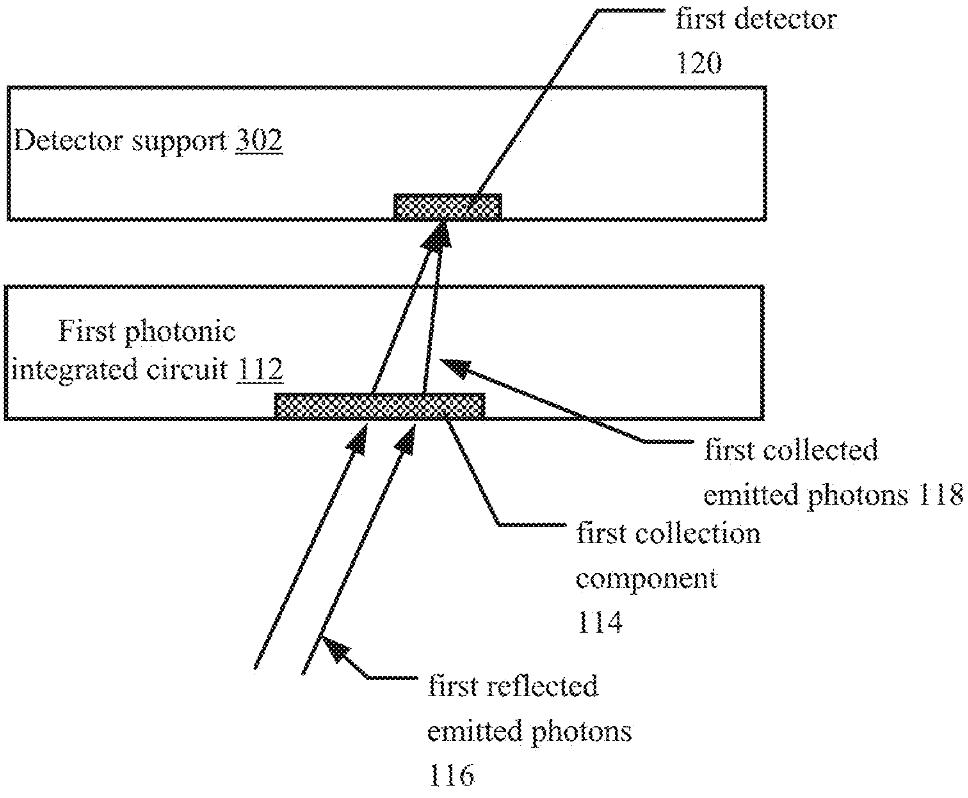
FIG. 3 is a schematic diagram of a portion of a photonic integrated circuit and a detector, according to an example embodiment.

FIG. 3 illustrates a schematic diagram of a portion of a photonic integrated circuit and a detector support, according to an example embodiment herein. In an example embodiment, the detector 120 is placed adjacent and/or in proximity of the first photonic integrated circuit 112. For example, the first detector 120 may be placed on a detector support 302 located adjacent and/or in proximity of the first photonic integrated circuit 112. The detector support 302 may include a circuitry for collecting and/or transmitting detected signal from the first detector 120.

In various embodiments, the first collected emitted photon(s) 118 travels through the first photonic integrated circuit 122, after being collected using the first collection component 114. After traveling through the first photonic integrated circuit 122, the first collected emitted photon(s) 118 may reach and be detected by the first detector 120 in proximity of the first photonic integrated circuit 122.

Figure 4:
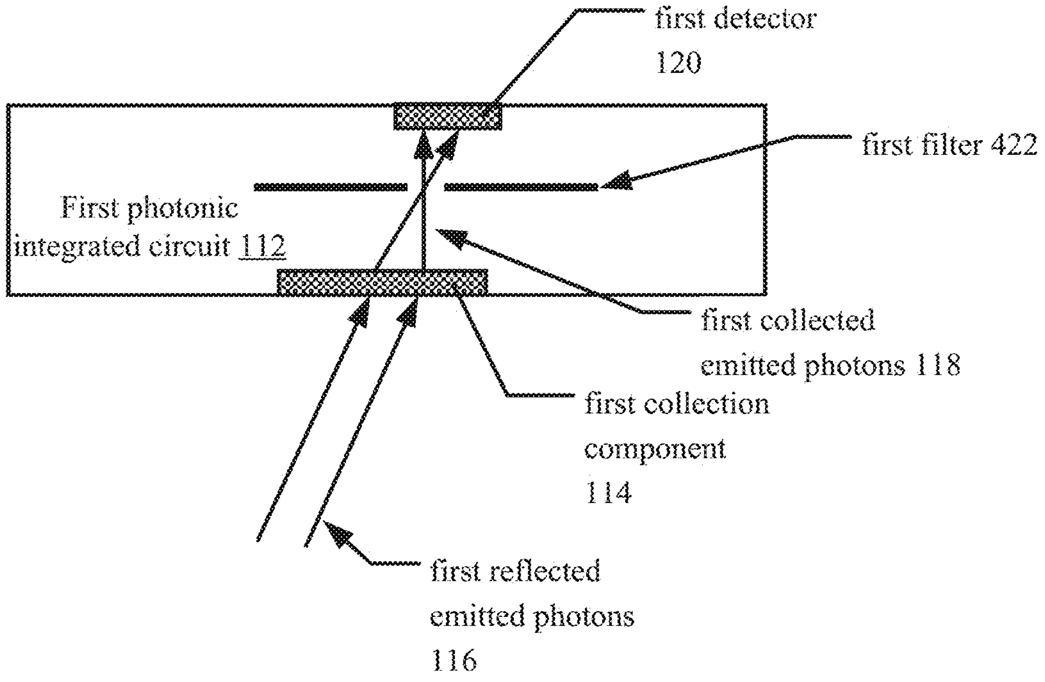
FIG. 4 is a schematic diagram of a portion of a photonic integrated circuit and a detector, according to an example embodiment.

FIG. 4 illustrates a schematic diagram of a portion of a photonic integrated circuit, according to an example embodiment herein. In an example embodiment, after the first reflected emitted photon(s) 116 is collected by the first collection component 114, the first collected emitted photon(s) 118 is generated. In example embodiments, a first filter 422 filters the first collected emitted photon(s) 118.

The first filter 422 may for example be any of a spatial filter, a frequency filter, an intensity filter, and/or any other filters configured to filter any aspects of the first collected emitted photon(s) 118. In example embodiments, the first filter 422 includes an aperture. In example embodiments, the filter 422 includes an opaque material configured to block the first collected emitted photon(s) 118 and an opening or any other materials capable of passing the first collected emitted photon(s) 118. In example embodiments, the first filter 422 provides for the first collected emitted photon(s) 118 to mainly reach the first detector 120 instead of being scattered to the surrounding areas of the first detector 120. In various embodiments, the first filter 422 is integrated with the first photonic integrated circuit 112. In various embodiments, the first filter 422 is a separate component from the first photonic integrated circuit 112.

Figure 5:
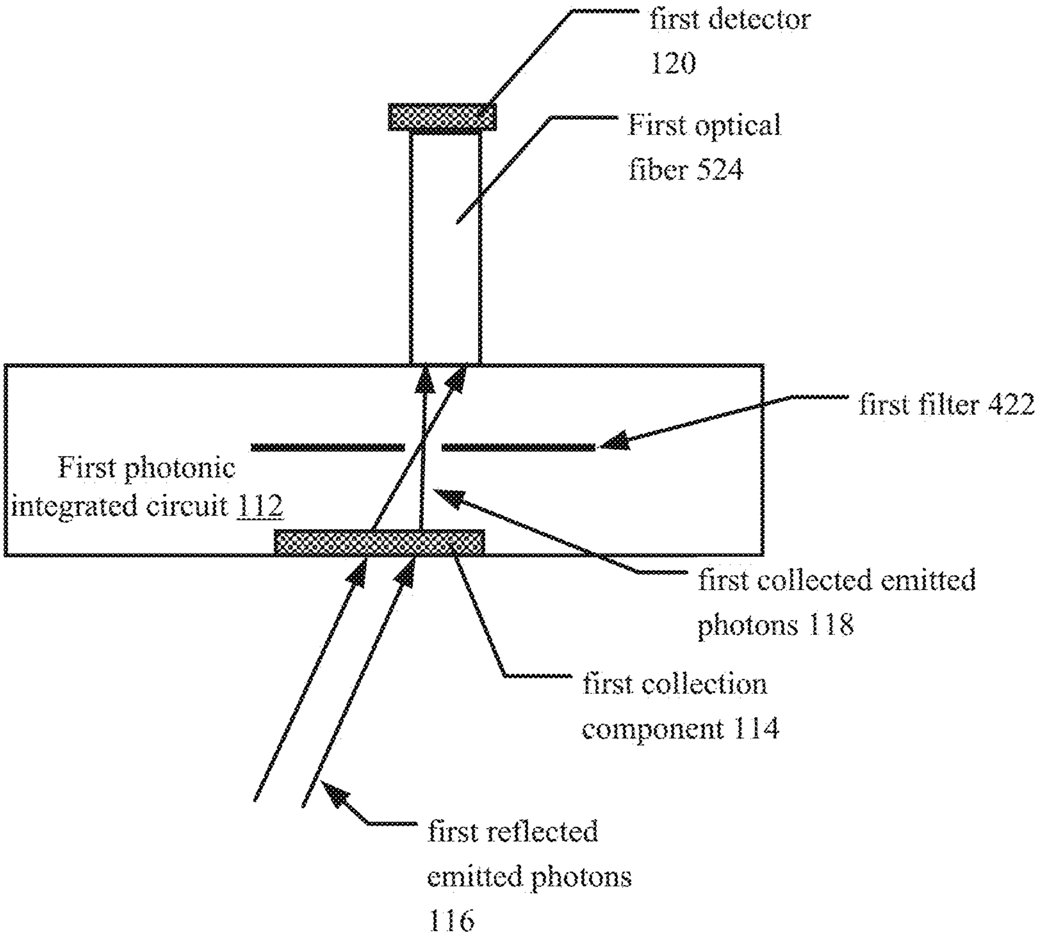
FIG. 5 is a schematic diagram of a portion of a photonic integrated circuit coupling to a detector using an optical fiber, according to an example embodiment.

FIG. 5 illustrates a schematic diagram of a portion of a photonic integrated circuit, according to an example embodiment herein. In example embodiments, an optical fiber 524 is optically coupled between the first photonic integrated circuit 112 and the first detector 120. The first collected emitted photon(s) 118 may travel through the optical fiber 524 to reach the first detector 120. In example embodiments, the first collected emitted photon(s) 118 is filtered using the first filter 422 before reaching the optical fiber 524. The first filter 422 may prevent and/or reduce the first collected emitted photon(s) 118 from being scattered to the surroundings of the first optical fiber 524.

In example embodiments, using the optical fiber 524 to convey the first collected emitted photon(s) 118 provides for flexibility in placing the first detector with respect to the first photonic integrated circuit 112. For example, the first detector 120 may be located in a way to provide for a more compact overall system. In other examples, the first detector 120 may be located further away from the first photonic integrated circuit 112 because the optical fiber 524 may carry the first collected emitted photon(s) 118 to any distance and/or location. This may be due to the flexibility of the optical fiber 524 and its capability of carrying the first collected emitted photon(s) 118 along its length and while having various shapes and and/or bends. In example embodiments, the optical fiber 524 may be a single mode or a multimode optical fiber.

Figure 6:
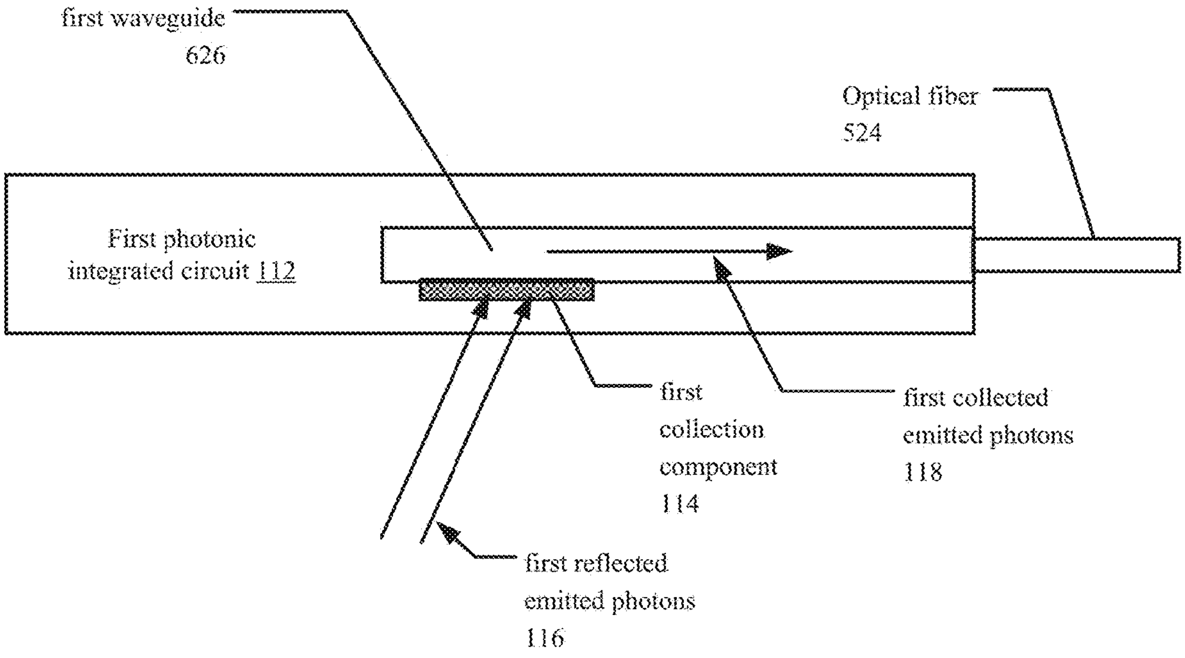
FIG. 6 is a schematic diagram of a portion of a photonic integrated circuit including a waveguide coupling to an optical fiber, according to an example embodiment.

FIG. 6 illustrates a schematic diagram of a portion of a photonic integrated circuit, according to an example embodiment herein. In example embodiments, the first collection component 114 may be optically coupled to a first waveguide 626. The first waveguide 626 may for example by integral to the first photonic integrated circuit 112. In other examples, the first waveguide 626 may be a separate component from the first photonic integrated circuit 112. In example embodiments, the first collection component 114 is disposed on and/or is optically coupled to the first waveguide 626.

In various embodiments, the first waveguide 626 is configured to covey and/or guide the first collected emitted photon(s) 118 inside the first photonic integrated circuit 112. In example embodiments, the first waveguide 626 comprises a transparent material with a different refractive index from the first photonic integrated circuit 112. For example, the first waveguide 626 may guide the first collected emitted photon(s) 118 inside the first photonic integrated circuit 112 using total internal reflection.

In example embodiment, the optical fiber 524 may be optically coupled to the first waveguide 626. For example, the first collected emitted photon(s) 118, after being guided inside the first photonic integrated circuit 112 using the first waveguide 626, is conveyed on the optical fiber 524. The first collected emitted photon(s) 118 may be conveyed to the first detector 120 (referring to FIGS. 1-5) using the optical fiber 524.

In various embodiments, the detected photon(s) are used to determine whether or not a quantum object fluoresced in response to a reading signal being incident thereon. In various embodiments, the detected photon(s) are used to cause entanglement between two or more quantum objects. For example, in various embodiments, photon(s) emitted by a first and/or second quantum object may be detected in a manner that such that it is not possible to determine whether the first quantum object, the second quantum object, or both the first and second quantum objects emitted the photon(s), causing the quantum entanglement of the first and second quantum object. Such entanglement of the first and second quantum objects (e.g., respective quantum states of the first and second quantum objects) may be used to perform quantum entangling gates on the first and second quantum objects while the first and second quantum objects are separated by a distance (e.g., are not located near enough one another to interact with one another directly).

Figure 7A:
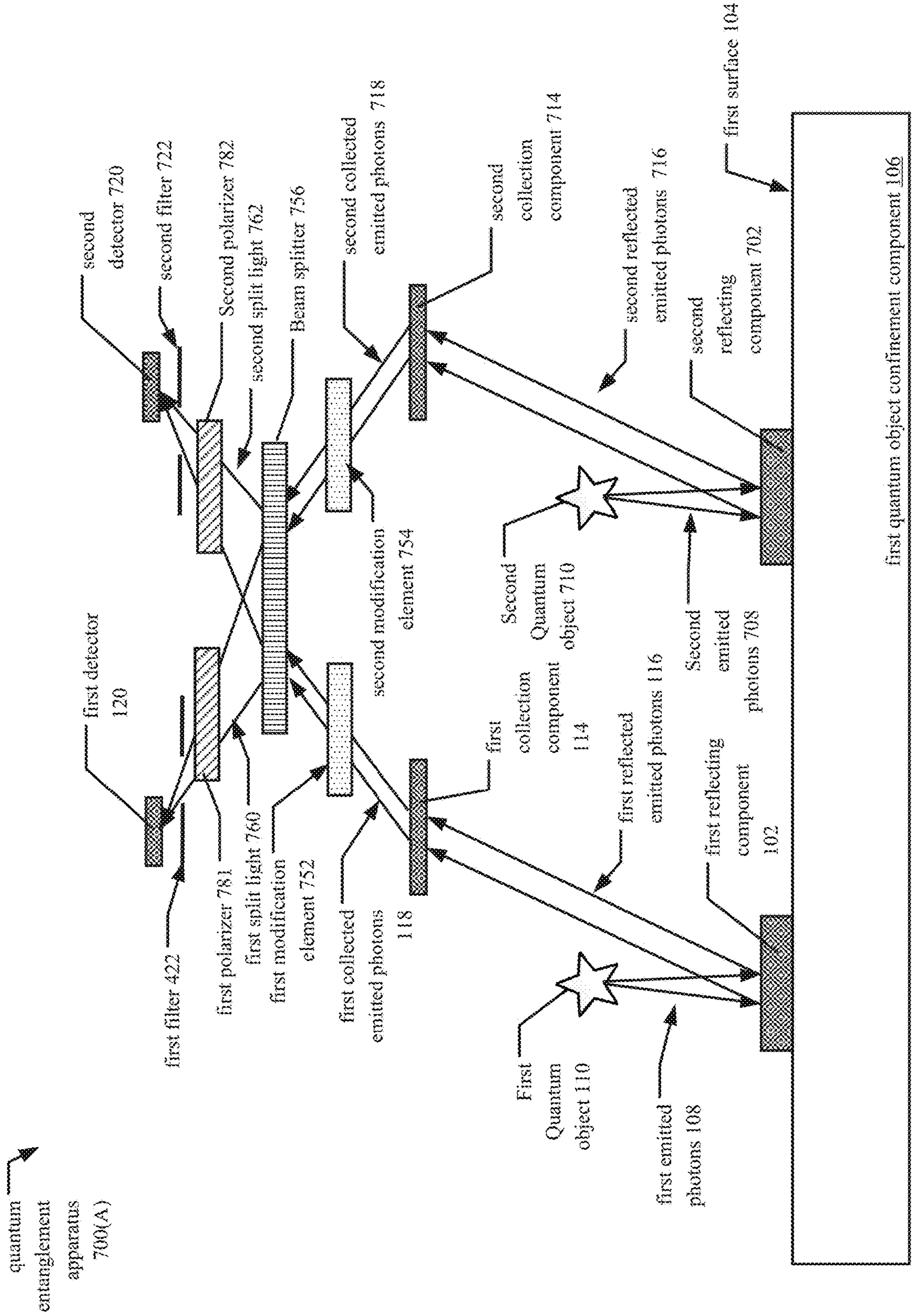
FIG. 7(A) is a schematic diagram of a quantum entanglement apparatus, according to an example embodiment.

FIG. 7(A) illustrates a schematic diagram of a quantum entanglement apparatus 700(A) according to an example embodiment herein. In an example embodiment, with reference to FIG. 1, the quantum entanglement apparatus 700(A) includes the first reflecting component 102 and a second reflecting component 702 disposed on the first surface 104 of the first quantum object confinement component 106. The first reflecting component 102 may reflect the first emitted photon(s) 108 emitted by the first quantum object 110 to generate a first reflected emitted photon(s) 116. The second reflecting component 702 may reflect a second emitted photon(s) 708 emitted by a second quantum object 710 to generate a second reflected emitted photon(s) 716. In an example embodiment, the second quantum object 710 is trapped using the first quantum object confinement component 106.

In various embodiments, the emitted photon(s) 108 may be emitted in response to a reading signal incident on the first quantum object 110 and the second emitted photon(s) 708 may be emitted in response to a reading signal incident on the second quantum object 710.

In various embodiments the quantum entanglement apparatus 700(A) further includes a first collection component 114. The first collection component 114 may collect the first reflected emitted photon(s) 116 after they are reflected by the first reflecting component 102.

In various embodiments the quantum entanglement apparatus 700(A) further includes a second collection component 714. The second collection component 714 may collect the second reflected emitted photon(s) 716 after it is reflected by the second reflecting component 702.

In example embodiments, any of the first collection component 114 and/or the second collection component 714 may include any of a refractive lens, a diffractive lens, an aperture, a metasurface lens, and/or any optical component capable of passing photons through. In example embodiments, a metasurface lens may include an array of metamaterial structures where each metamaterial structure individually performs a function on and/or conveys the first reflected emitted photon(s) 116 and/or the second reflected emitted photon(s) 716.

In an example embodiment, the first collection component 114 produces the first collected emitted photon(s) 118 and the first collection component 714 produces a second collected emitted photon(s) 718. In an example embodiment, the first detector 120 receives and/or detects the first collected emitted photon(s) 118 and a second detector 720 receives and/or detects a second collected emitted photon(s) 718. In example embodiments, the first photonic integrated circuit 112 includes a transparent material through which the first collected emitted photon(s) 118 and the second collected emitted photon(s) 718 travel to reach the first detector 120 and the second detector 720, respectively. In example embodiments, the first detector 120 and the second detector 720 are disposed on the first photonic integrated circuit 112. In various embodiments, any of the first detector 120 and/or the second detector 720 is a photodetector such as a photodiode, photomultiplier tube (PMT), charge-coupled device (CCD), Complementary metal-oxide-semiconductor (CMOS) detector, and/or other photon detector.

In an example embodiment, the quantum entanglement apparatus 700(A) includes the first filter 422 on a first optical path between the first collecting component 114 and the first detector 120. The quantum entanglement apparatus 700(A) may include a second filter 722 on a second optical path between the second collecting component 719 and the second detector 720. In example embodiments, the first and second filters may be any of a spatial, frequency, intensity, and/or any other type of optical filters.

In an example embodiment, the quantum entanglement apparatus 700(A) includes a beam splitter 756 configured to receive the first collected emitted photon(s) 118 and the second collected emitted photon(s) 718 simultaneously. The beam splitter 756 may be configured to generate splitter first output photon(s) 760 and splitter second output photon(s) 762 by any of splitting and/or combining the first and second collected emitted photon(s) 118 and 718. For example, the beam splitter 756 may direct the first collected emitted photon(s) 118 and the second collected emitted photon(s) 718 to respective output ports of the beam splitter 756. For example, the beam splitter 756 may direct a first collected emitted photon to a first respective output port of the beam splitter and the direct a second collected emitted photon to a second respective output port of the beam splitter 756, where the first and second respective output ports are the same output port in some instances and different output ports in some instances. Each of the respective output ports is configured to provide and/or direct photons to a respective optical path. For example, in the illustrated embodiment of FIG. 7A, the first optical path includes the first polarizer 781, first filter 422, and terminates at the first detector 120 and the second optical path includes the second polarizer 782, second filter 722, and terminates at the second detector 720. For example, the first detector 120 detects photons that have been provided to the first optical path by the beam splitter 756 and the second detector 720 detects photons that have been provided to the second optical path by the beam splitter 756.

In various embodiments herein, the splitter first output photon(s) 760 and the splitter second output photon(s) 762 are indistinguishable from each other. In various embodiments, when the splitter first output photon(s) 760 and the splitter second output photon(s) 762 are simultaneously detected by the first detector 120 and the second detector 720, the first quantum object 110 and the second quantum object 710 are entangled. In example embodiments, the splitter first output photon(s) 760 and the splitter second output photon(s) 762 travel thought the transparent material of the first photonic integrated circuit 112 to reach the first detector 120 and the second detector 720, respectively.

In an example embodiment, the quantum entanglement apparatus 700(A) includes a first modification component 752 and a second modification component 754. In various embodiments, the first modification component 752 is configured to modify any of a phase, polarization, amplitude, frequency, and/or a time delay of any of the first collected emitted photon(s) 118 and/or the splitter first output photon (s) 760. For example, the first modification component 752 may be located before or after the beam splitter 756 on the optical beam path between the first collection component 114 and the first detector 120. In example embodiments, a modification component may be located before and another modification component may be located after the beam splitter 756 on the optical beam path between the first collection component 114 and the first detector 120.

In an example embodiment, a second modification component 754 is configured to modify any of a phase, polarization, amplitude, frequency, and/or a time delay of any of the second collected emitted photon(s) 718 and/or the splitter second output photon(s) 762. For example, the second modification component 754 may be located before or after the beam splitter 756 on the optical beam path between the second collection component 714 and the second detector 720. In example embodiments, a modification component may be located before and another modification component may be located after the beam splitter 756 on the optical beam path between the second collection component 714 and the second detector 720.

In an example embodiment, by modifying the collected emitted photon(s) and/or the splitter output photon(s), the modification components provide for indistinguishable photons to reach the first and second detectors simultaneously. In an example embodiment, the quantum entanglement apparatus 700(A) is configured to entangle the first quantum object 110 and the second quantum object 710 when the first detector 120 and the second detector 720 respectively detect the splitter first output photon(s) 760 and the splitter second output photon(s) 762 simultaneously.

In various embodiments, the quantum entanglement apparatus 700(A) includes a first polarizer 781 and a second polarizer 782. The first polarizer 781 is configured to receive photons traversing the first optical path corresponding to a first output port of the beam splitter 756 (e.g., the first split light 760). The first polarizer 781 transmits photons having a first polarization toward the first detector 120 and reflects photons having a second, different polarization. The second polarizer 782 is configured to receive photons traversing the second optical path corresponding to a second output port of the beam splitter 756 (e.g., the second split light 762). The second polarizer 782 transmits photons having the first polarization (or the second polarization, in an example embodiment) toward the second detector 720 and reflects photons having the second, different polarization (or the first polarization, in an example embodiment). In various embodiments, the first and second polarized photon(s) have an opposite polarization.

Figure 7B:
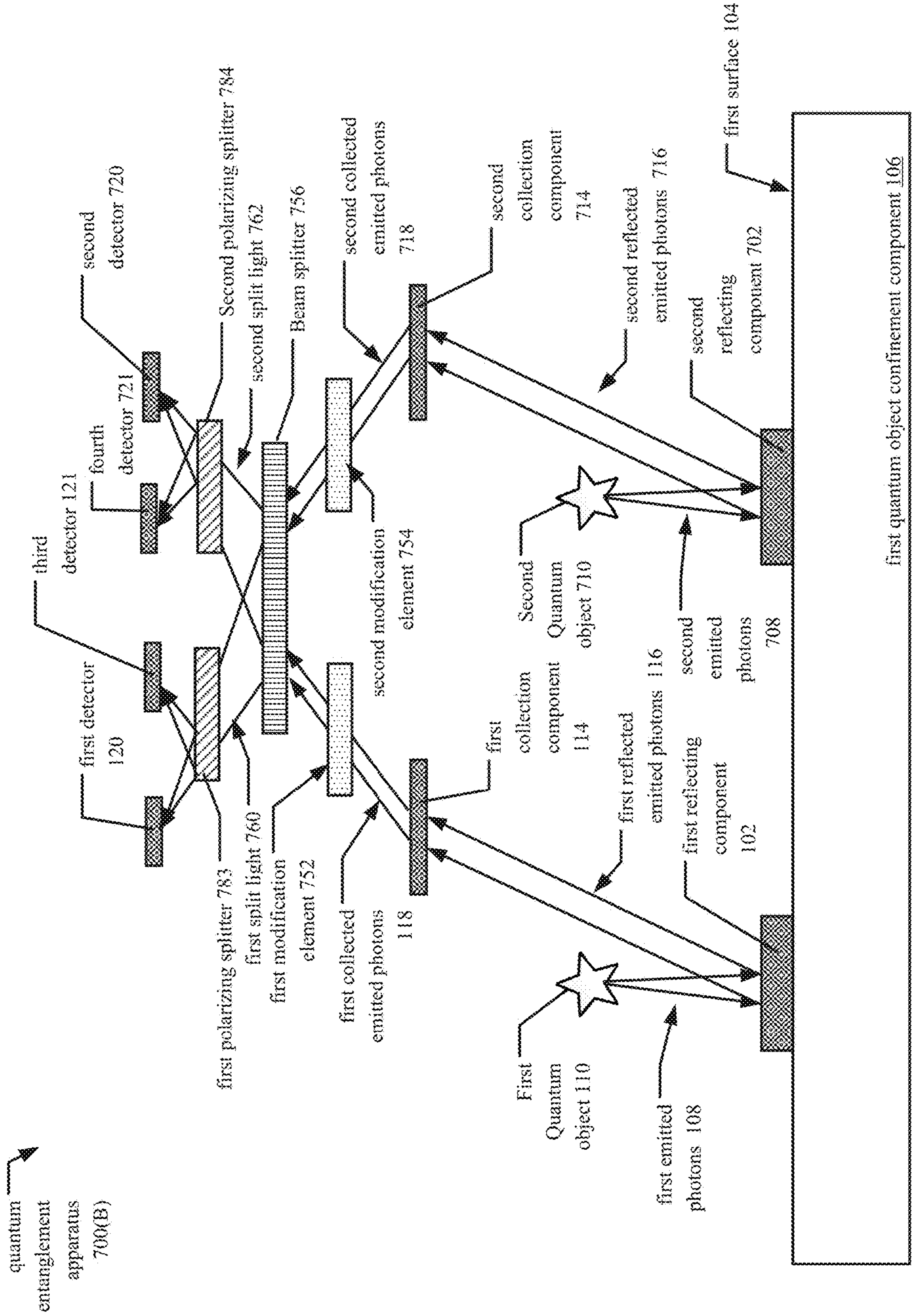
FIG. 7(B) is a schematic diagram of a quantum entanglement apparatus, according to an example embodiment.

FIG. 7(B) illustrates a schematic diagram of a quantum entanglement apparatus 700(B) according to an example embodiment herein. In various embodiments, the quantum entanglement apparatus 700(B), includes a first polarizing splitter 783 and a second polarizing splitter 784. In various embodiments, the first polarizing splitter 783 generates the first polarized photon(s) detected by the first detector 120 and third polarized photon(s) detected by a third detector 121. In various embodiments, the second polarizing splitter 784 generates the second polarized photon(s) detected by the second detector 720 and fourth polarized photon(s) detected by a fourth detector 721. In example embodiments, the first detector 120 captures photons that have a different and/or opposite polarization from the photons captured by the third detector 121 and the second detector 720 captures photons that have different and/or opposite polarization from the photons captured by the fourth detector 721.

Figure 7C:
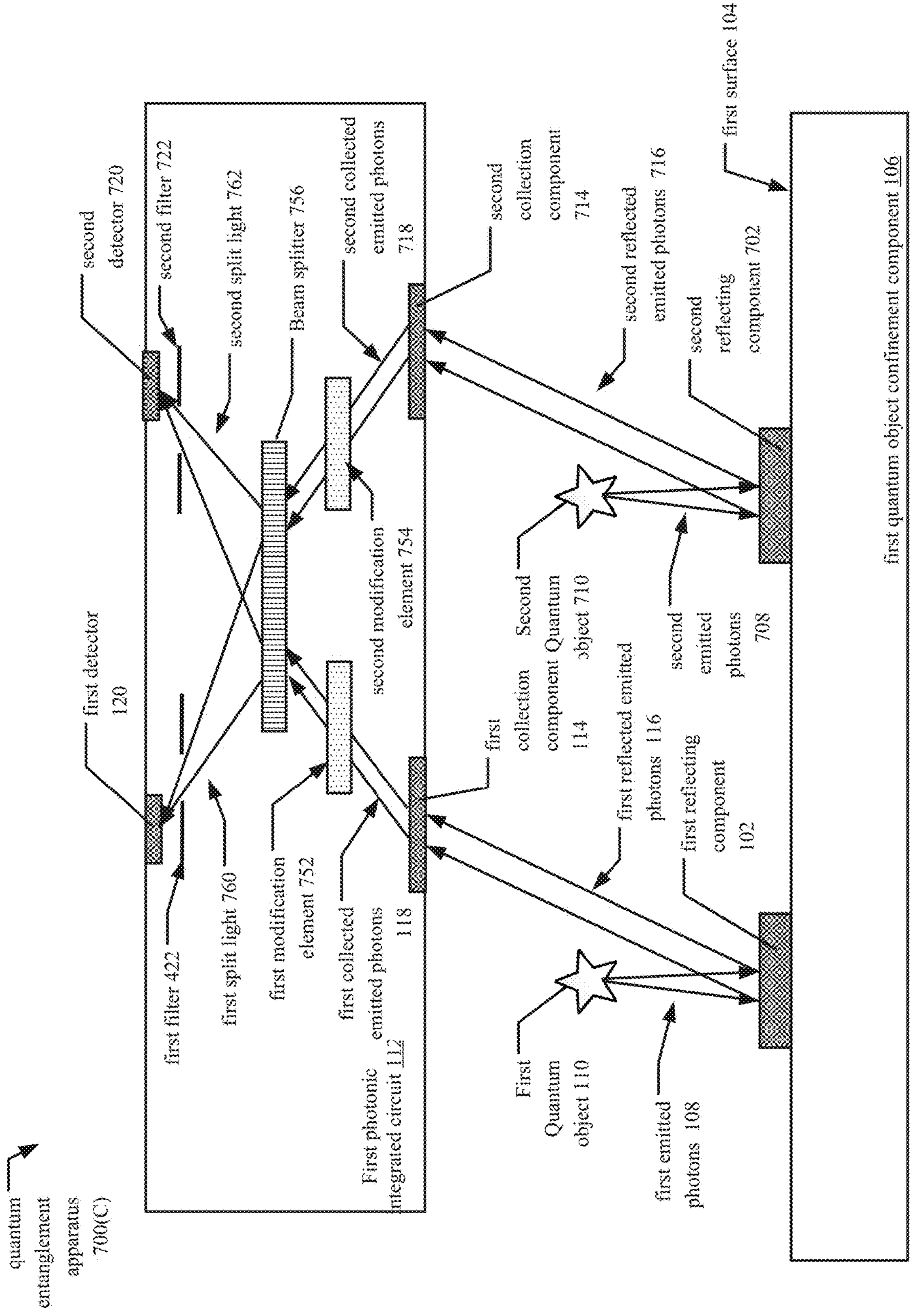
FIG. 7(C) is a schematic diagram of a quantum entanglement apparatus, according to an example embodiment.

FIG. 7(C) illustrates a schematic diagram of a quantum entanglement apparatus 700(C) according to an example embodiment herein. In an example embodiment, with reference to FIG. 1, the quantum entanglement apparatus 700(C) includes the first reflecting component 102 and a second reflecting component 702 disposed on the first surface 104 of the first quantum object confinement component 106. The first reflecting component 102 may reflect the first emitted photon(s) 108 emitted by the first quantum object 110 to generate a first reflected emitted photon(s) 116. The second reflecting component 702 may reflect a second emitted photon(s) 708 emitted by a second quantum object 710 to generate a second reflected emitted photon(s) 716. In an example embodiment, the second quantum object 710 is trapped using the first quantum object confinement component 106.

In various embodiments, the emitted photon(s) 108 may be emitted in response to a reading signal incident on the first quantum object 110 and the second emitted photon(s) 708 may be emitted in response to a reading signal incident on the second quantum object 710.

In various embodiments the quantum entanglement apparatus 700(C) further includes the first photonic integrated circuit 112 placed on the first side of the first quantum object confinement component 106. The first collection component 114 may be optically coupled to the first photonic integrated circuit 112. The first collection component 114 may collect the first reflected emitted photon(s) 116 after it is reflected by the first reflecting component 102.

In various embodiments the quantum entanglement apparatus 700(C) further includes a second collection component 714. The second collection component 714 may be optically coupled to the first photonic integrated circuit 112. The second collection component 714 may collect the second reflected emitted photon(s) 716 after it is reflected by the second reflecting component 702.

In example embodiments, any of the first collection component 114 and/or the second collection component 714 may include any of a refractive lens, a diffractive lens, an aperture, a metasurface lens, and/or any optical component capable of passing photons through. In example embodiments, a metasurface lens may include an array of metamaterial structures where each metamaterial structure individually performs a function on and/or conveys the first reflected emitted photon(s) 116 and/or the second reflected emitted photon(s) 716.

In an example embodiment, the first collection component 114 produces the first collected emitted photon(s) 118 and the first collection component 714 produces a second collected emitted photon(s) 718. In an example embodiment, the first detector 120 receives and/or detects the first collected emitted photon(s) 118 and a second detector 720 receives and/or detects a second collected emitted photon(s) 718. In example embodiments, the first photonic integrated circuit 112 includes a transparent material through which the first collected emitted photon(s) 118 and the second collected emitted photon(s) 718 travel to reach the first detector 120 and the second detector 720, respectively. In example embodiments, the first detector 120 and the second detector 720 are disposed on the first photonic integrated circuit 112. In various embodiments, any of the first detector 120 and/or the second detector 720 is a photodetector such as a photodiode, photomultiplier tube (PMT), charge-coupled device (CCD), Complementary metal-oxide-semiconductor (CMOS) detector, and/or other photon detector.

In an example embodiment, the quantum entanglement apparatus 700(C) includes the first filter 422 on a first optical path between the first collecting component 114 and the first detector 120. The quantum entanglement apparatus 700(C) may include a second filter 722 on a second optical path between the second collecting component 719 and the second detector 720. In example embodiments, the first and second filters may be any of a spatial, frequency, intensity, and/or any other type of optical filters.

In an example embodiment, the quantum entanglement apparatus 700(C) includes a beam splitter 756 configured to receive the first collected emitted photon(s) 118 and the second collected emitted photon(s) 718 simultaneously. The beam splitter 756 may be configured to generate splitter first output photon(s) 760 and splitter second output photon(s) 762 by any of splitting and/or combining the first and second collected emitted photon(s) 118 and 718. In various embodiments herein, the splitter first output photon(s) 760 and the splitter second output photon(s) 762 are indistinguishable from each other. In various embodiments, when the splitter first output photon(s) 760 and the splitter second output photon(s) 762 are simultaneously detected by the first detector 120 and the second detector 720, the first quantum object 110 and the second quantum object 710 are entangled. In example embodiments, the splitter first output photon(s) 760 and the splitter second output photon(s) 762 travel thought the transparent material of the first photonic integrated circuit 112 to reach the first detector 120 and the second detector 720, respectively.

In an example embodiment, the quantum entanglement apparatus 700(C) includes a first modification component 752 and a second modification component 754. In various embodiments, the first modification component 752 is configured to modify any of a phase, polarization, amplitude, frequency, and/or a time delay of any of the first collected emitted photon(s) 118 and/or the splitter first output photon(s) 760. For example, the first modification component 752 may be located before or after the beam splitter 756 on the optical beam path between the first collection component 114 and the first detector 120. In example embodiments, a modification component may be located before and another modification component may be located after the beam splitter 756 on the optical beam path between the first collection component 114 and the first detector 120.

In an example embodiment, a second modification component 754 is configured to modify any of a phase, polarization, amplitude, frequency, and/or a time delay of any of the second collected emitted photon(s) 718 and/or the splitter second output photon(s) 762. For example, the second modification component 754 may be located before or after the beam splitter 756 on the optical beam path between the second collection component 714 and the second detector 720. In example embodiments, a modification component may be located before and another modification component may be located after the beam splitter 756 on the optical beam path between the second collection component 714 and the second detector 720.

In an example embodiment, by modifying the collected emitted photon(s) and/or the splitter output photon(s), the modification components provide for indistinguishable photons to reach the first and second detectors simultaneously. In an example embodiment, the quantum entanglement apparatus 700(C) is configured to entangle the first quantum object 110 and the second quantum object 710 when the first detector 120 and the second detector 720 respectively detect the splitter first output photon(s) 760 and the splitter second output photon(s) 762 simultaneously.

Figure 8:
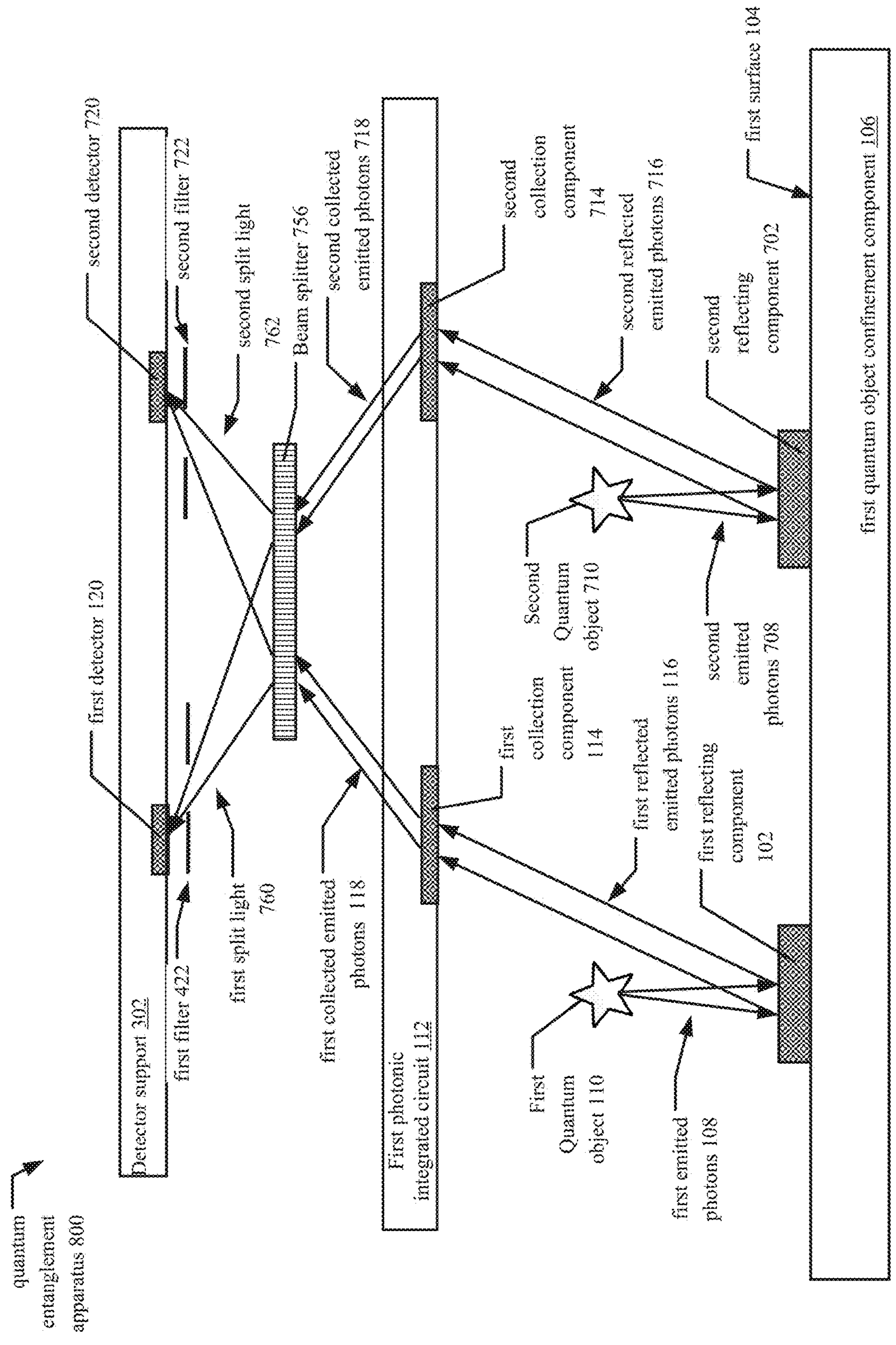
FIG. 8 is a schematic diagram of a quantum entanglement apparatus, according to an example embodiment.

FIG. 8 illustrates a schematic diagram of a quantum entanglement apparatus 800 according to an example embodiment herein. In an example embodiment, with reference to FIG. 1-FIG. 7(C), the quantum entanglement apparatus 800 includes the first and second reflecting components 102 and 702 disposed on the first quantum object confinement component 106. The first and second reflecting components 102 and 702 may reflect the first and second emitted photon(s) 108 and 708 to produce the first and second reflected emitted photon(s) 116 and 716, respectively. In example embodiments, the first and second collection components 114 and 714, disposed on the first photonic integrated circuit 112, are configured to collect the first and second reflected emitted photon(s) 116 and 716.

In example embodiments, in response to collecting the first and second reflected emitted photon(s), the first collection component 114 generates the first collected emitted photon(s) 118 and the second collection component 714 generates the second collected emitted photon(s) 718. In example embodiments, the first detector 120 and the second detector 720 are disposed on a detector support 302. As discussed with reference to FIG. 3, the detector support 302 may be placed adjacent to and/or in proximity of the first photonic integrated circuit 112.

In example embodiments the first and second collected emitted photon(s) 118 and 718 may travel in free space between the first photonic integrated circuit 112 and the detector support 302 to reach the first and second detectors 120 and 720. The first and second collected emitted photon(s) 118 and 718 may pass through the beam splitter 756 placed in the free space between the first photonic integrated circuit 112 and the detector support 302.

In various embodiments, the first and second collected emitted photon(s) 118 and 718 may pass through the first and second filters 422 and 722. In example embodiments, the first and second filters 422 and 722 may be any of the filters described above with respect to FIGS. 4, 5, and/or 7. In example embodiments, the filters 422 and 722 may be placed in the free space between the first photonic integrated circuit 112 and the detector support 302.

In example embodiments, one or more modification components may be located on each optical path between the first or second collection components 114 and 714 and the first and second detectors 120 and 720, as for example described with reference to FIG. 7(A), FIG. 7(B), or FIG. 7(C).

In an example embodiment, by modifying the collected emitted photon(s) and/or the splitter output photon(s), the modification components provide for indistinguishable photon(s) to reach the first and second detectors 120 and 720 simultaneously. In an example embodiment, the quantum entanglement apparatus 800 is configured to entangle the first quantum object 110 and the second quantum object 710 when the first detector 120 and the second detector 720 respectively detect the splitter first output photon(s) 760 and the splitter second output photon(s) 762 simultaneously.

Figure 9A:
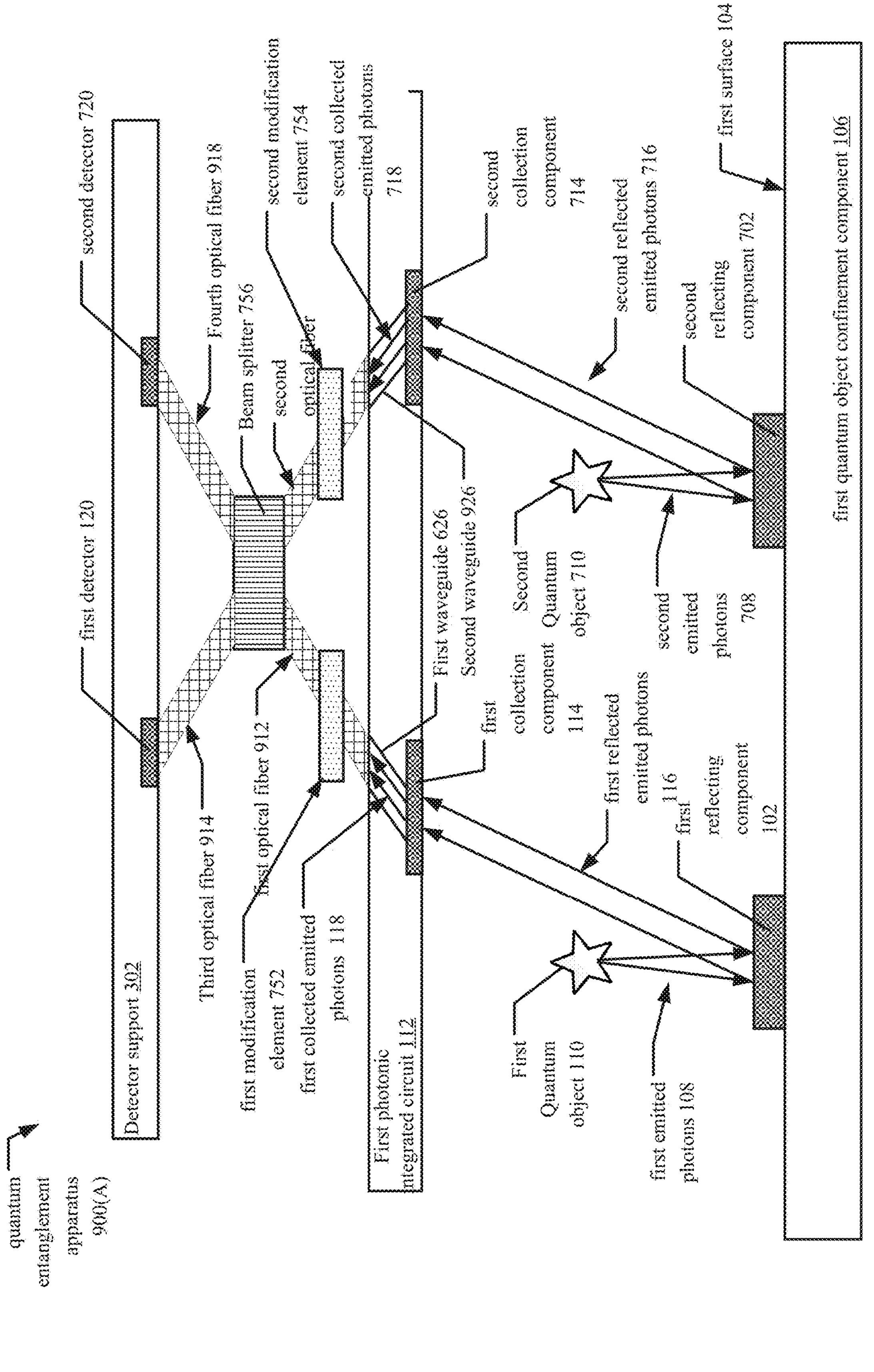
FIG. 9(A) is a schematic diagram of a quantum entanglement apparatus, according to an example embodiment.

FIG. 9(A) illustrates a schematic diagram of a quantum entanglement apparatus 900(A) according to an example embodiment herein. For example, the quantum entanglement apparatus 800 uses similar components and arrangements used by the quantum entanglement apparatus 800 with reference to FIG. 8, to generate the first and second collected emitted photons 118 and 718.

In example embodiments, the first and second collected emitted photons 118 and 718 travel to the first and second detectors 120 and 720 using optical fibers. For example, a first optical fiber 912 is coupled to the first photonic integrated circuit 112. The first optical fiber 912 may be configured to convey the first collected emitted photon(s) 118 to the beam splitter 756. A third optical fiber 914 is coupled to the beam splitter 756. The third optical fiber 914 may be configured to convey the splitter first output photon(s) (for example splitter first output photon(s) 760 with reference to FIG. 7 or 8) to the first detector 120. A second optical fiber 916 may be coupled to the first photonic integrated circuit 112. The second optical fiber 916 may be configured to convey the second emitted photon(s) 718 to the second detector 720. A fourth optical fiber 918 may be coupled to the beam splitter 756, the fourth optical fiber 918 may be configured to convey the splitter second output photon(s) (for example splitter second output photon(s) 762 with reference to FIGS. 7 and 8) to the second detector 720.

In example embodiments, with reference to FIG. 6, a first waveguide 626 may be optically coupled with any of the first photonic integrated circuit 112, the first collection component 114 and/or the first optical fiber 912. In example embodiments, the first waveguide 626 may be configured to convey the first collected emitted photon(s) 118 from the first collection component 114 to the first optical fiber 912. In example embodiments, the first collection component 114 may be deposed on first waveguide 626.

In example embodiments, a second waveguide 926 may be optically coupled with any of the first photonic integrated circuit 112, the second collection component 714 and/or the second optical fiber 916. In example embodiments, the second waveguide 926 may be configured to convey the second collected emitted photon(s) 718 from the second collection component 714 to the second optical fiber 916.

In various embodiments, the first and second collected emitted photon(s) may travel through the first photonic integrated circuit 112 without a need for the first and/or the second waveguides.

In example embodiments, with reference to FIGS. 7 and/or 8, one or more modification components 752 and 754 may be coupled on each optical path, such as any of the first, second, third and/or fourth optical fibers between the first or second collection components 114 and 714 and the first and second detectors 120 and 720. In an example embodiment herein, as shown in FIG. 9(A), the first and second modification components 752 and 754 are shown to be coupled to the first optical fiber 912 and the second optical fiber 916, respectively. However, as described above, other configurations and locations for the first and second modification components are possible.

In an example embodiment, by modifying the collected emitted photon(s) and/or the splitter output photon(s), the modification components provide for indistinguishable photons to reach the first and second detectors 120 and 720 simultaneously. In an example embodiment, the quantum entanglement apparatus 900(A) is configured to entangle the first quantum object 110 and the second quantum object 710 when the first detector 120 and the second detector 720 respectively detect the splitter first output photon(s) 760 and the splitter second output photon(s) 762 simultaneously.

Figure 9B:
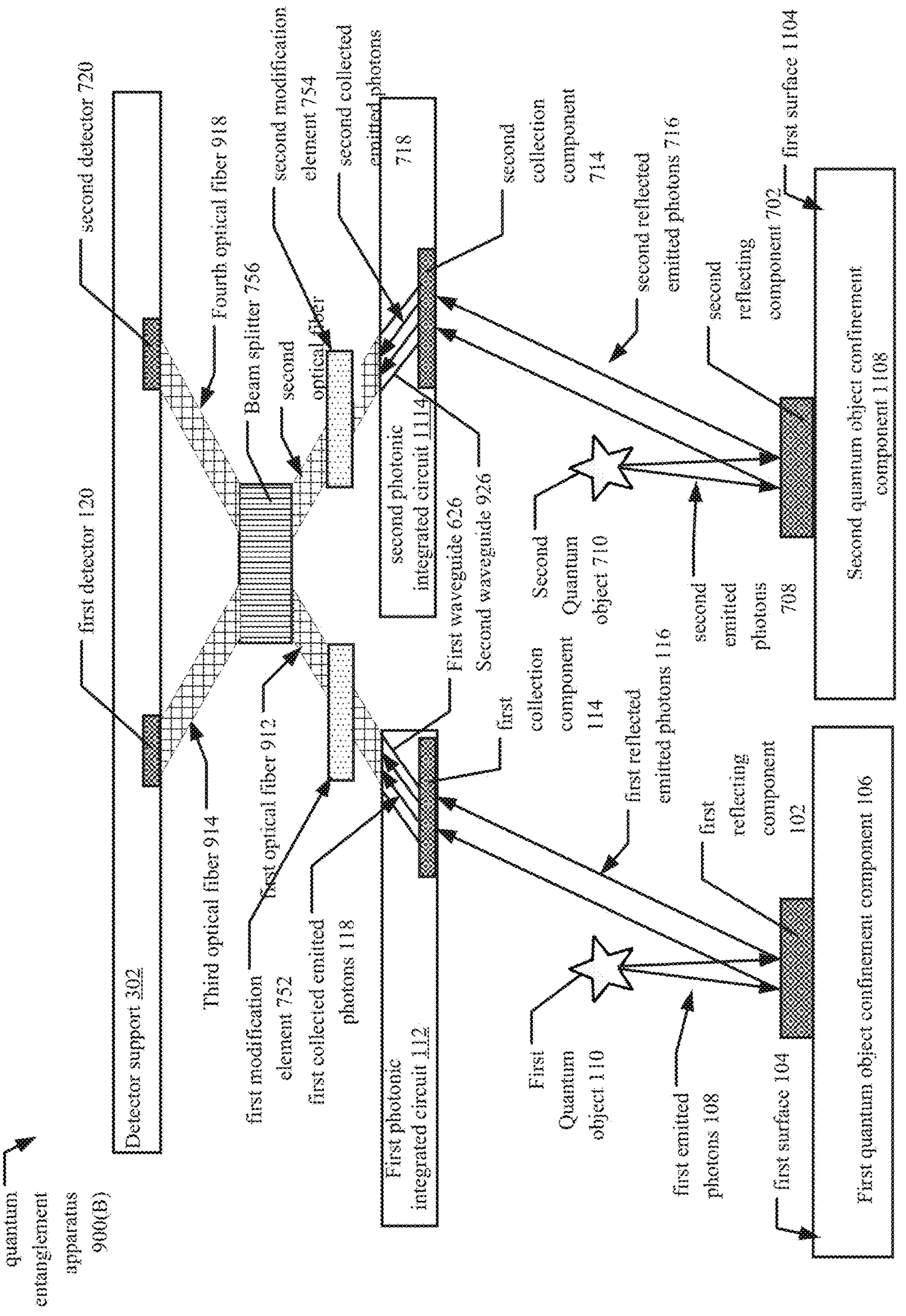
FIG. 9(B) is a schematic diagram of a quantum entanglement apparatus, according to an example embodiment.

FIG. 9(B) illustrates a schematic diagram of a quantum entanglement apparatus 900(B) according to an example embodiment herein. In various embodiments, the quantum entanglement apparatus 900(B) includes the first quantum object confinement component 106 for trapping the first quantum object 110 and a second quantum object confinement component 1108 for trapping the second quantum object 710. In example embodiments, the first reflecting component 102 may be disposed on the first surface 104 of the first quantum object confinement component 106 and a second reflecting component 702 may be disposed on a first surface 1104 of the second quantum object confinement component 1108.

In example embodiments, the first quantum object confinement component 106 and the second quantum object confinement component 1108 may be located in the same cryostat and/or vacuum chamber of the one or more cryostats and/or vacuum chambers as for example shown in the quantum computing system 1500 depicted in FIG. 15 below.

In example embodiments, the first quantum object confinement component 106 and the second quantum object confinement component 1108 may be located in different cryostats and/or vacuum chambers of the one or more cryostats and/or vacuum chambers as for example shown in the quantum computing system 1500 depicted in FIG. 15 below.

In various embodiments, the first collection component 114 is disposed on a first photonic integrated circuit 112. The first collection component 114 may be configured to collect the first reflected emitted photon(s) 116 and generated the first collected emitted photon(s) 118. In an example embodiment, the second collection component 714 is disposed on a second photonic integrated circuit 1114. The second collection component 714 may be configured to collect the second reflected emitted photon(s) 716 and generate the second collected emitted photon(s) 718.

In example embodiments, the first photonic integrated circuit 112 and the second photonic integrated circuit 1114 may be located in the same cryostat and/or vacuum chamber of the one or more cryostats and/or vacuum chambers as for example shown in the quantum computing system 1500 depicted in FIG. 15 below. In example embodiments, the first photonic integrated circuit 112 and the second photonic integrated circuit 1114 may be located in different cryostats and/or vacuum chambers of the one or more cryostats and/or vacuum chambers as for example shown in the quantum computing system 1500 depicted in FIG. 15 below.

In various embodiments, the first collected emitted photon(s) 118 and the second collected emitted photon(s) 718 are transmitted to the beam splitter 756 and the first and second detectors 120 and 720 as for example depicted in and described with reference to FIG. 9(A).

Figure 10:
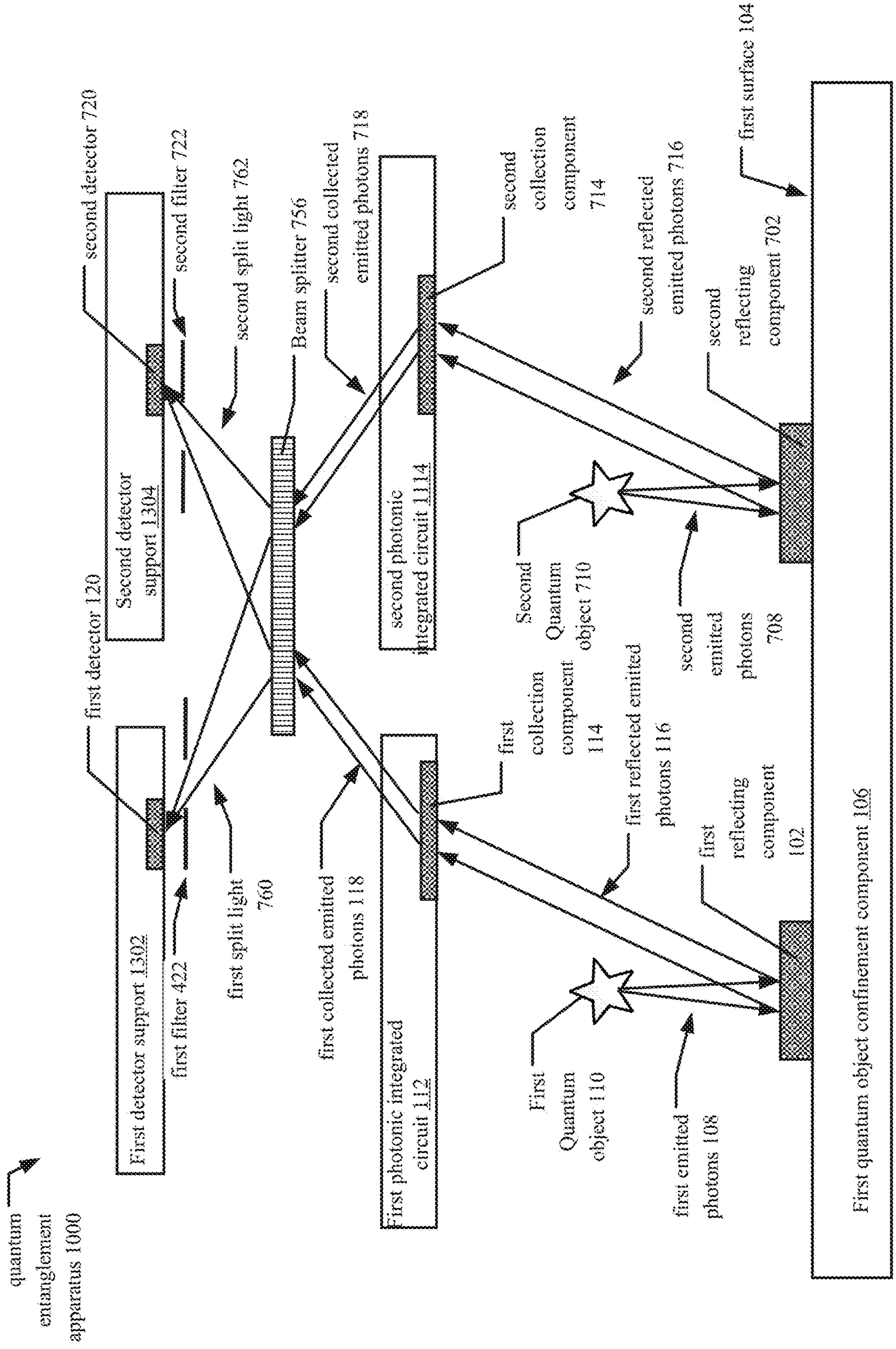
FIG. 10 is a schematic diagram of a quantum entanglement apparatus, according to an example embodiment.

FIG. 10 illustrates a schematic diagram of a quantum entanglement apparatus 1000 according to an example embodiment herein. In an example embodiment, the first collection component 114 is disposed on a first photonic integrated circuit 112. The first collection component 114 may be configured to collect the first reflected emitted photon(s) 116 and generated the first collected emitted photon(s) 118. In an example embodiment, the second collection component 714 is disposed on a second photonic integrated circuit 1114. The second collection component 714 may be configured to collect the second reflected emitted photon(s) 716 and generate the second collected emitted photon(s) 718.

In example embodiments, the photonic integrated circuit, such as the photonic integrated circuit 1114 is an integrated optical circuit including one or more optical components. In example embodiments, the photonic integrated circuit such as the photonic integrated circuit 1114 is a substrate different from the substrate where the quantum object confinement component such as the quantum object confinement component 106 is formed on.

In example embodiments, the first and second collected emitted photon(s) 118 and 718 travel to the first and second detectors 120 and 720 in free space, as for example shown in FIG. 10 and described for example with reference to FIG. 8. In example embodiments, the first detector 120 may be supported by a first detector support 1302 and the second detector 720 may be supported by the second detector support 1304.

In example embodiments, the first and second collected emitted photon(s) 118 and 718 may travel from the first and second integrated circuits 112 and 1114 to the first and second detectors 120 and 720 by being carried using optical fibers as for example illustrated and described with reference to FIG. 9(A) or FIG. 9(B). In example embodiments, the first optical fiber 912 may be coupled to the first photonic integrated circuit 112 and the second optical fiber 916 may be coupled to the second photonic integrated circuit 1114.

In various embodiments, the quantum entanglement apparatus 1000 includes any of the beam splitter, modification components and/or filters and provides entanglement between the first and second quantum objects 110 and 710 as illustrated and/or described with reference to FIGS. 7-9.

Figure 11:
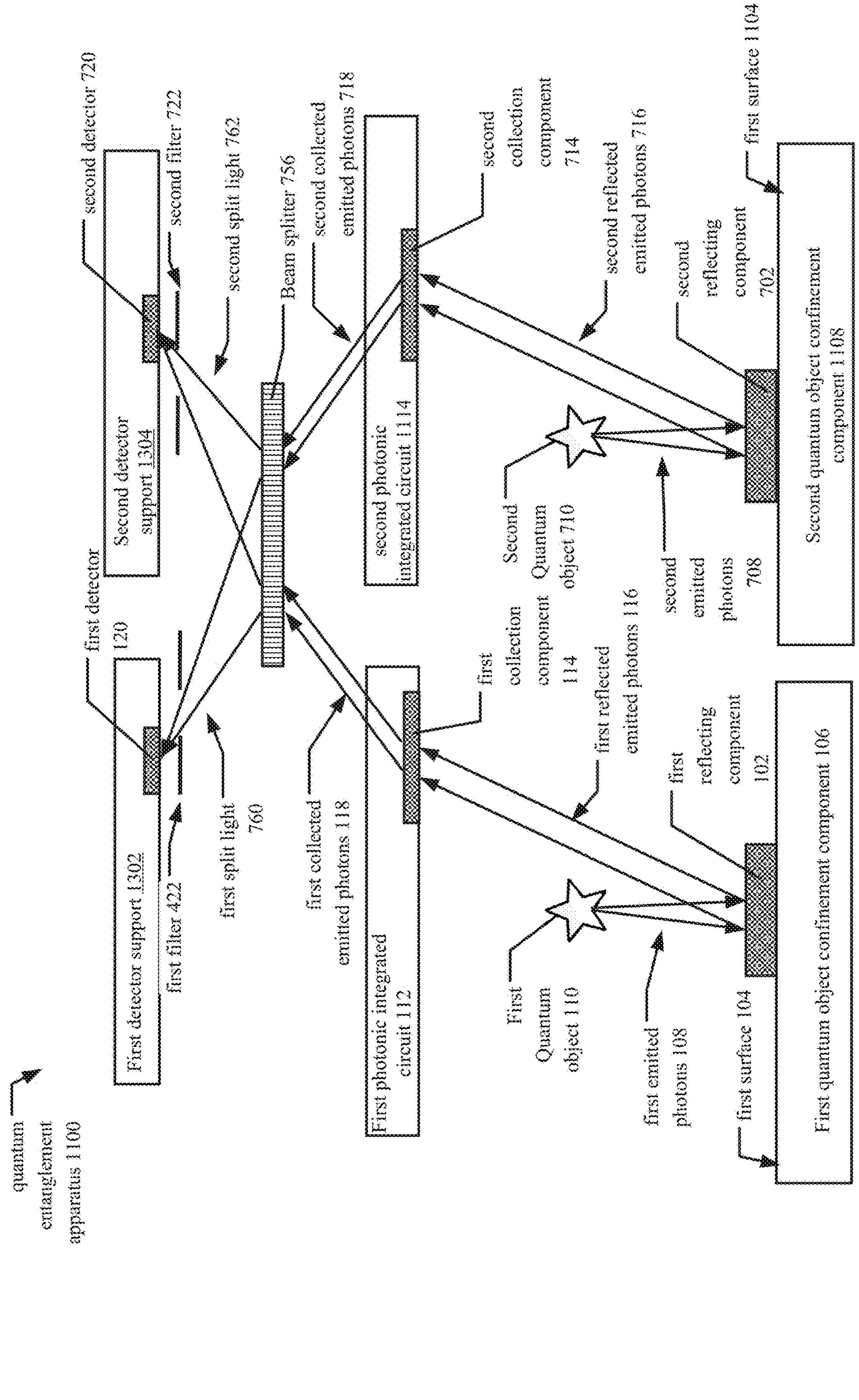
FIG. 11 is a schematic diagram of a quantum entanglement apparatus, according to an example embodiment.

FIG. 11 illustrates a schematic diagram of a quantum entanglement apparatus 1100 according to an example embodiment herein. In example embodiments, the first quantum object 110 may be trapped on a first quantum object confinement component 106 and the second quantum object 710 may be trapped on a second quantum object confinement component 1108. In example embodiments, the first reflecting component 102 may be disposed on the first surface 104 of the first quantum object confinement component 106 and a second reflecting component 702 may be disposed on a first surface 1104 of the second quantum object confinement component 1108.

In various embodiments, the first and second emitted photons are reflected, collected, conveyed, modified, filtered, and/or detected using any of the corresponding components and/or methods described with reference to FIGS. 6-10.

Figure 12:
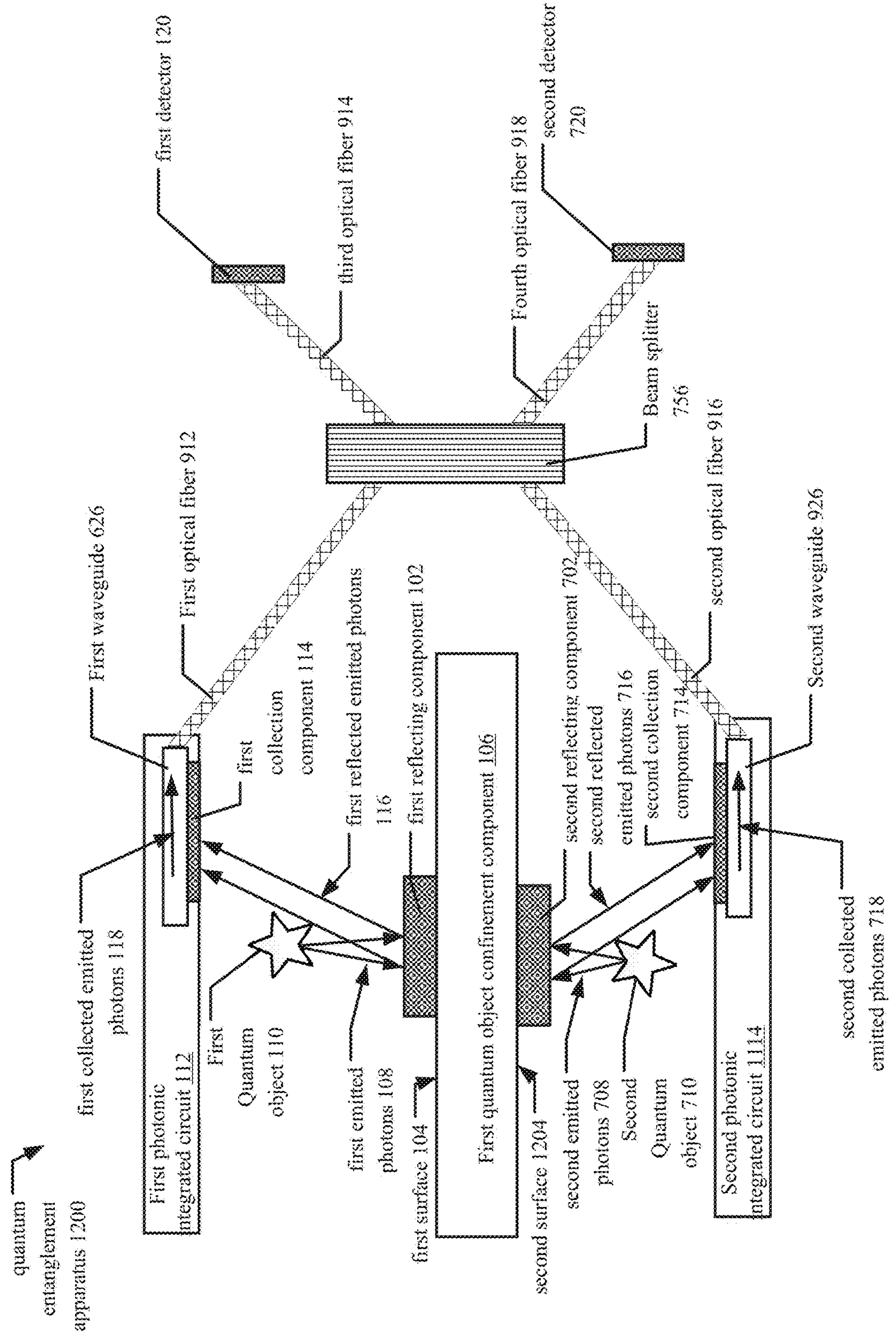
FIG. 12 is a schematic diagram of a quantum entanglement apparatus, according to an example embodiment.

FIG. 12 illustrates a schematic diagram of a quantum entanglement apparatus 1200 according to an example embodiment herein. In an example embodiment, with reference to FIGS. 1-FIG. 11, the first reflecting component 102 is disposed on a first surface 104 of the first quantum object confinement component 106. The first reflecting component 102 may reflect the first emitted photon(s) 108 from the first quantum object 110 to generate the first reflected emitted photon(s) 116. The first reflected emitted photon(s) 116 may be collected using the first collection component 114 coupled to the first photonic integrated circuit 112. In example embodiments, the first photonic integrated circuit 112 is placed on a first side of the first quantum object confinement component 106.

In example embodiments, the first collection component 114 collects the first reflected emitted photon(s) 116 to generate the first collected emitted photon(s) 118. In various embodiments, the first collected emitted photon(s) 118 may reach one or more detectors using any of the methods and components previously described.

In example embodiments, the first waveguide 626 is optically coupled to the first collection component 114. The first collected emitted photon(s) 118 may be conveyed and/or guided through the first waveguide 626 to a first optical fiber 912.

In example embodiments, a second reflecting component 702 is disposed on a second surface 1204 of the first quantum object confinement component 106. The second reflecting component 702 may reflect the second emitted photon(s) 708 from the second quantum object 710 to generate the second reflected emitted photon(s) 716. The second reflected emitted photon(s) 716 may be collected using the second collection component 714 coupled to the second photonic integrated circuit 1114. In example embodiments, the second photonic integrated circuit 1114 is placed on a second side of the first quantum object confinement component 106.

In example embodiments, the second collection component 714 collects the second reflected emitted photon(s) 716 to generate the second collected emitted photon(s) 718. In various embodiments, the second collected emitted photon(s) 718 may reach one or more detectors using any of the methods and components previously described.

In example embodiments, the second waveguide 926 is optically coupled to the second collection component 714. The second collected emitted photon(s) 718 may be conveyed and/or guided through the second waveguide 926 to a second optical fiber 916.

In example embodiments, any combination of optical fibers, beam splitter(s), filter(s), modification component(s) may be used to convey the collected emitted photon(s) beams to the detector(s) as previously described, for example as described above with reference to FIG. 9(A) or FIG. 9(B).

With reference to FIGS. 1-12, by using the first and second reflecting components 102 and 702 to reflect the first and second emitted photon(s) 108 and 708 from the first and second quantum objects 110 and 710 to the first and second collection components 114 and 714 respectively, various embodiments herein may increase the amount and/or efficiency of the collected and or detected photon(s). For example, the first and second quantum objects 110 and 710 may be closer to the corresponding surfaces of the first quantum object confinement component 106 as compared to the corresponding first or second collection components 114 or 714. For example, using the first reflecting component 102 on the first surface 104 of the first quantum object confinement component 106 may provide for more of the first emitted photon(s) 108 to reach the first collection components 114 and the first detector 120. For example, using the second reflecting component 702 on the first surface 104 or second surface 1204 of the first quantum object confinement component 106 (or the corresponding surface of the second quantum object confinement component 1108) may provide for more of the first emitted photon(s) 108 or the second emitted photon(s) 708 to reach the first or second collection components 114 or 714 and the first or second detectors 120 or 720 respectively. This may increase the efficiency of a quantum entanglement apparatus using the various components and/or arrangement illustrated by FIGS. 1-12.

In various embodiments, the first and second emitted photons 108 and 708 are scattered in all directions from the first quantum object 110 and the second quantum object 710, respectively. The first and second collection components 114 and 714 may in addition to collecting the first and second reflected emitted photons 116 and 716, also collected the first and second emitted photons 108 and 708 directly from the first and second quantum objects. Various embodiments herein provide high efficiency for photon(s) collection and detection by providing for collection of the first and second reflected emitted photons 116 and 716 and/or also directly collecting the first and second emitted photons 108 and 708 from the first and second quantum objects 110 and 710.

Figure 13:
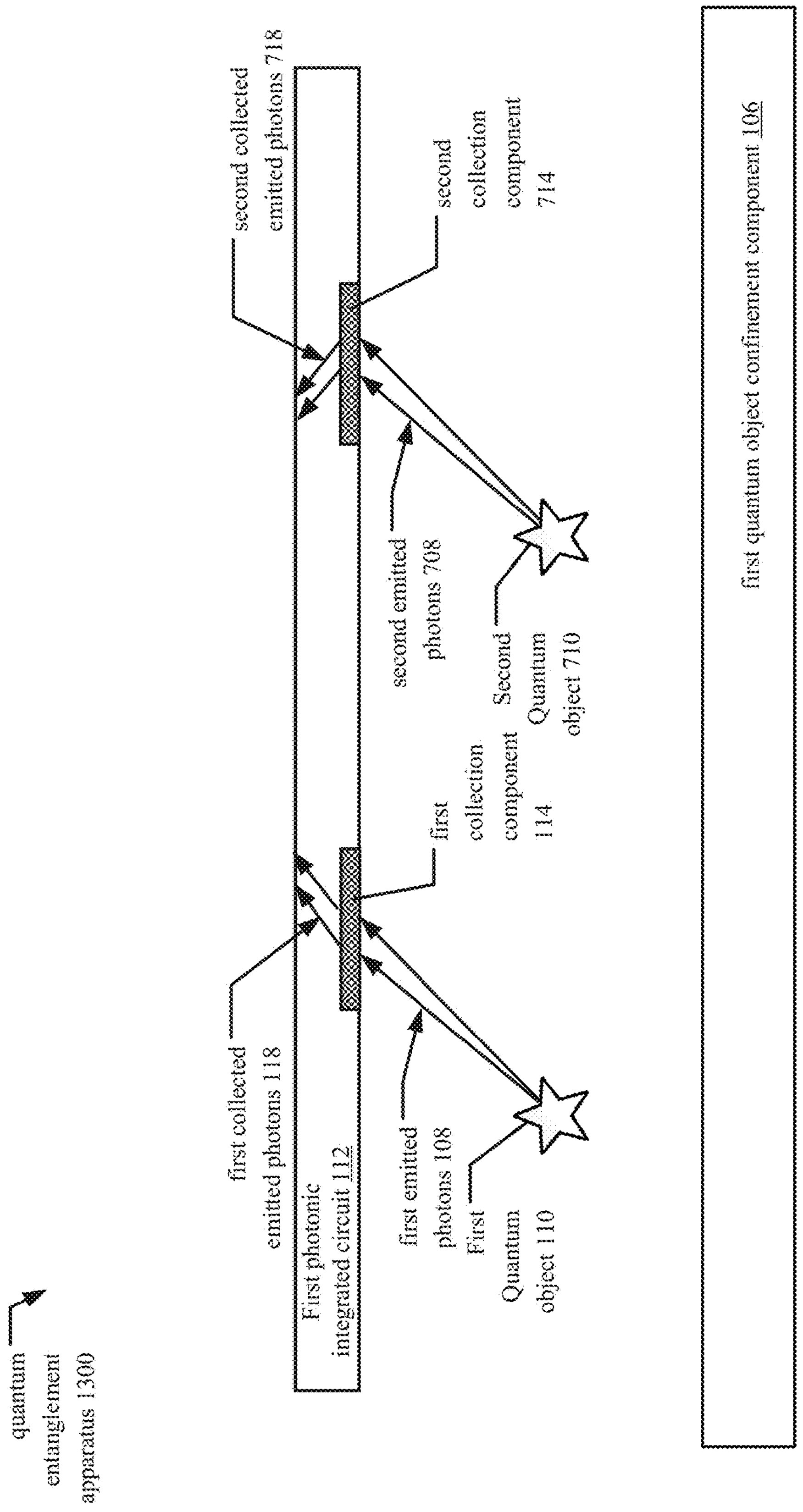
FIG. 13 is a schematic diagram of a portion of a quantum entanglement apparatus, according to an example embodiment.

FIG. 13 illustrates a schematic diagram of a portion of a quantum entanglement apparatus 1300 according to an example embodiment herein. In example embodiments, the first and second quantum objects 110 and 710 may be trapped on the first quantum object confinement component 106. The first and/or second emitted photons 108 and 708 may be collected, for example directly and/or without being reflected first on the surface of the confinement component, by one or more collection components on the first photonic integrated circuit 112. In an example embodiment, the first emitted photon(s) 108 emitted by the first quantum object 110 is collected by the first collection component 114 and the second emitted photon(s) 708 emitted by the second quantum object 710 is collected by the second collection component 714. In example embodiments, the first and second collected emitted photon(s) reach the detector(s) using any of the methods and/or components described above with reference to FIG. 1-FIG. 12.

In various embodiments herein, for example with respect to FIGS. 7(A)-13, the first quantum object 110 and the second quantum object 710 may be the same or different ion/atom species or a different type of qubit (i.e. superconductor, nitrogen-vacancy (NV) centers), and/or the like. For example, in certain embodiments, the first quantum object confinement apparatus and the second quantum object confinement apparatus may be ion traps, such as surface ion traps, Paul ion traps, and/or the like, and the quantum objects are ions. In other embodiments, the first quantum object confinement apparatus and the second quantum object confinement apparatus may be neutral atom traps (e.g., optical traps and/or the like) and the quantum objects are neutral atoms. Various other quantum object confinement apparatuses configured to confine various quantum objects may be used in various embodiments, as appropriate for the quantum objects used in the application.

Figure 14:
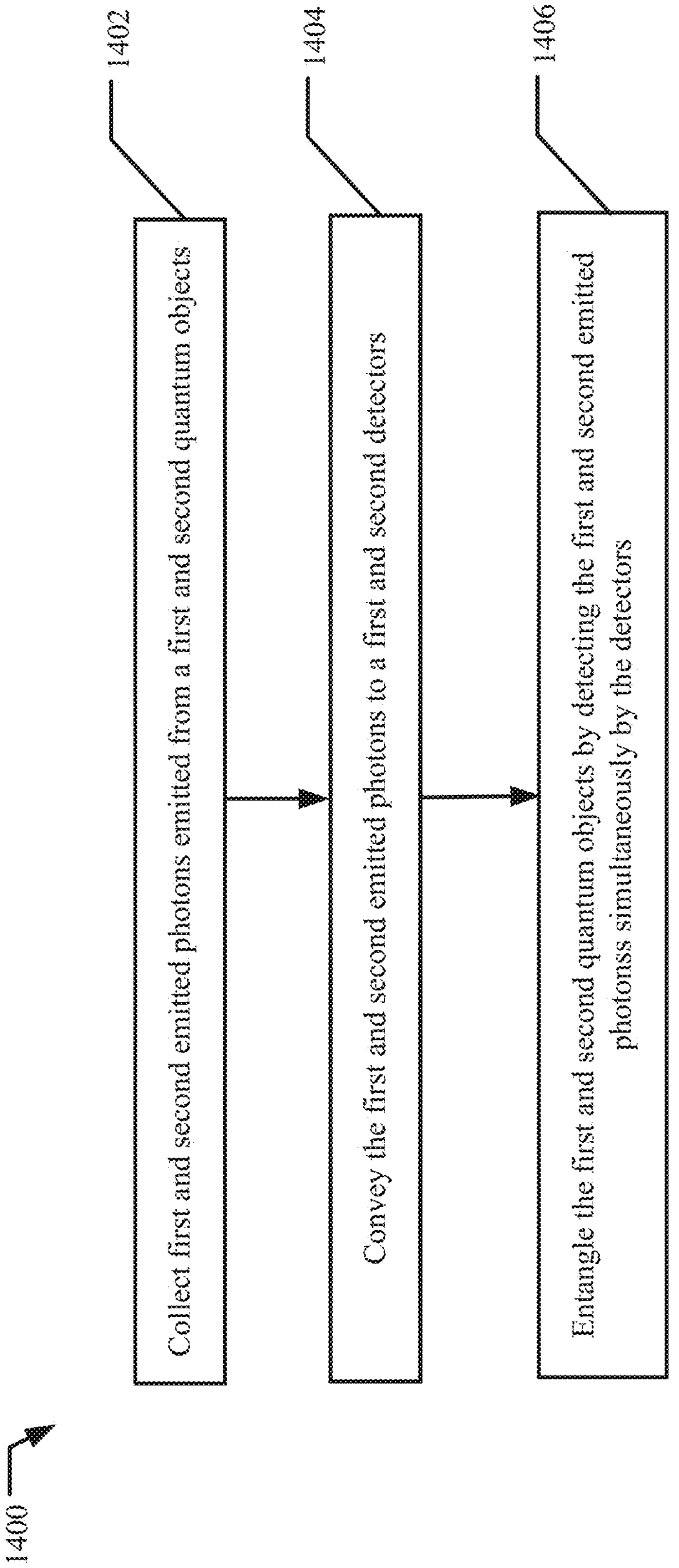
FIG. 14 is a flowchart illustrating a method according to various embodiments herein.

FIG. 14 is a flowchart illustrating a method 1400 for entangling a first and a second quantum objects according to various embodiments herein. In various embodiments, any of the quantum entanglement apparatus illustrated fully or in part using FIG. 1-FIG. 13 may be used to provide the entanglement.

In various embodiments, at step 1402, the quantum entanglement apparatus collects a first and/or second emitted photon(s) emitted from a first and/or second quantum objects. In example embodiments, any of the components and methods described above may be used to collect the first and second emitted photons. For example, a first and second emitted photons may be reflected using reflectors on a quantum object confinement component. The reflected emitted photon(s) may be collected using collection component(s) on one or more photon integrated circuits located adjacent to and/or in proximity of the quantum object confinement component as for example illustrated and described with reference to FIGS. 1-12. In example embodiments, the first and second emitted photons emitted by the first and second quantum objects may be, for example directly, collected by the one or more collection components, as for example illustrated and described with reference to FIG. 13.

In various embodiments, at step 1404, the quantum entanglement apparatus conveys the first and/or second emitted photon(s) to the first and second detectors. In example embodiments, any of the components and methods described above may be used to convey the collected first and/or second emitted photon(s) to the detectors. For example, any of the photonic integrated circuit, waveguides, optical fiber, and/or free space as illustrated and described with reference to FIGS. 1-13 may be used in conveying the collected photon(s). In example embodiments, any of the beam splitter(s), filter(s), modification component(s), etc. as for example described and illustrated above may be used.

In various embodiments, at step 1406, the quantum entanglement apparatus entangles the first and second quantum objects. For example, the quantum entanglement apparatus entangles the first and second quantum objects by detecting the first and/or second emitted photons simultaneously by the detectors with reference to any of the FIG. 1-FIG. 13. For example, the quantum entanglement apparatus entangles the first and second quantum objects by detecting the first and/or second emitted photons simultaneously by the detectors such that it is not possible to determine, based on the detection of the first and/or second emitted photons by the detectors, whether the first and/or second emitted photon(s) includes only first emitted photon(s) emitted by the first quantum object, only second emitted photon(s) emitted by the second quantum object, or first and second emitted photon(s) emitted by the first and second quantum objects, respectively.

Technical Advantages

Various embodiments provide technical solutions to technical problems related to collecting emitted photon(s) emitted from quantum objects. These various technical solutions provide for increasing the efficiency of collected photon(s) and increasing the likelihood of entanglement. These solutions further provide new and improved design and/or arrangement of components to increase the efficiency of quantum entanglement apparatuses.

Figure 15:
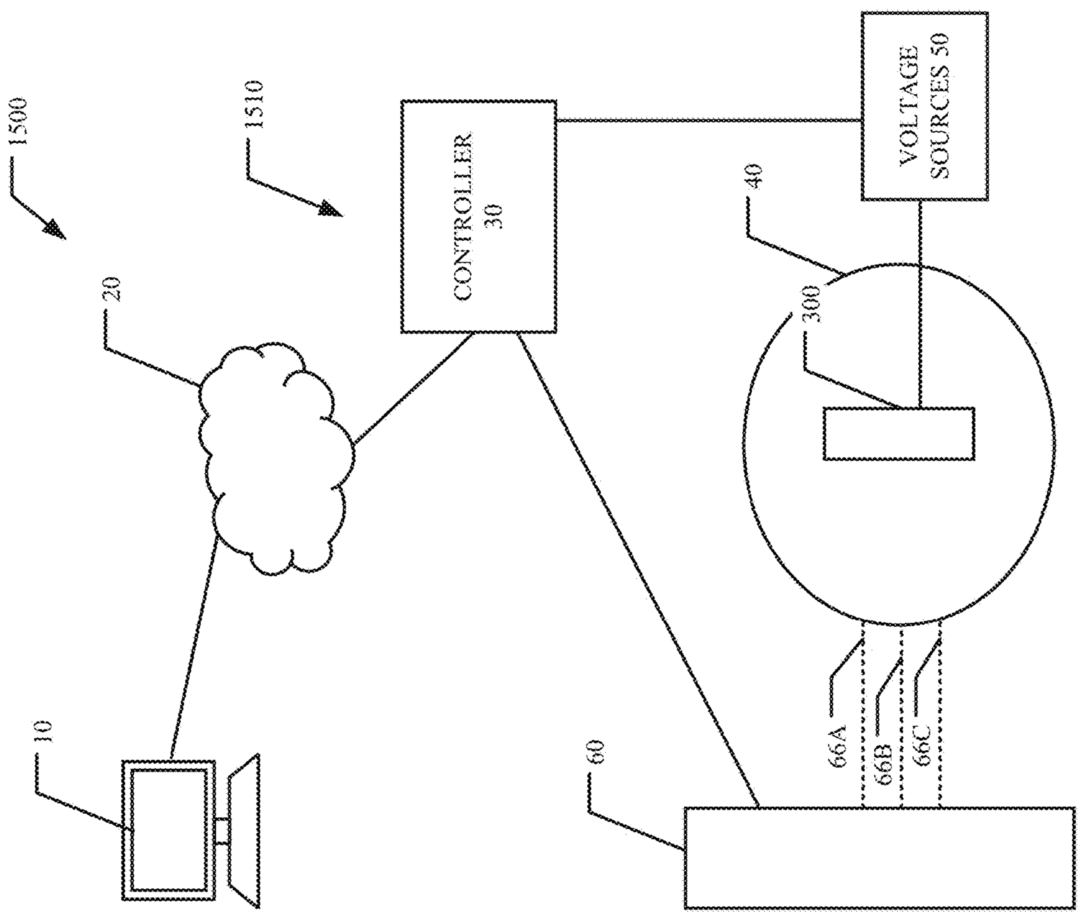
FIG. 15 is a schematic diagram illustrating an example quantum computing system comprising an object confinement apparatus, according to an example embodiment.

Exemplary Quantum Computing System Comprising an Quantum Object Confinement Apparatus FIG. 15 provides a schematic diagram of an example quantum computing system 1500 comprising a quantum object confinement apparatus 300 (e.g., a quantum object confinement component such as the first quantum object confinement component 106 and/or the second quantum object confinement component 1108 as described above and/or the like), in accordance with an example embodiment. In example embodiments, a plurality of metamaterial structures are formed and/or disposed on a surface of the quantum object confinement apparatus. In various embodiments, at least a portion of the meta material structures formed and/or disposed on the surface of the quantum object confinement apparatus are configured to be induced to emit an action signal toward and/or focused onto a respective quantum object location responsive to an incoming signal being incident thereon. The incoming signal is at least a portion of a manipulation signal generated by a manipulation source 60 of the quantum computer 1510. In various embodiments, at least a portion of the meta material structures formed and/or disposed on the surface of the quantum object confinement apparatus are configured to be induced to emit a collection signal toward and/or focused onto a collection position (e.g., where corresponding collection optical components are disposed) corresponding to the respective quantum object position responsive to an emitted signal emitted by a quantum object located at the respective quantum object position.

In various embodiments, the quantum system 100 comprises a computing entity 10 and a quantum computer 1510. In various embodiments, the quantum computer 1510 comprises a controller 30, one or more cryostats and/or vacuum chambers 40 each enclosing a confinement apparatus 300 (e.g., e.g., a quantum object confinement component such as the first quantum object confinement component 106 and/or the second quantum object confinement component 1108 as described above and/or the like), and one or more manipulation sources 60. In example embodiments, with reference to FIG. 11, the first quantum object confinement component 106 and the second quantum object confinement component 1108 may be located in the same cryostat and/or vacuum chamber of the one or more cryostats and/or vacuum chambers 40. In example embodiments, with reference to FIG. 11, the first quantum object confinement component 106 and the second quantum object confinement component 1108 may be located in different cryostats and/or vacuum chambers of the one or more cryostats and/or vacuum chambers 40.

For example, the one or more cryostats and/or vacuum chambers 40 may be a pressure-controlled chamber. In an example embodiment, the manipulation signals generated by the manipulation sources 60 are provided to the interior of the one or more cryostats and/or vacuum chambers 40 (where the quantum object confinement apparatus 300 is located) via corresponding optical paths 66 (e.g., 66A, 66B, 66C). In an example embodiment, the one or more manipulation sources 60 may comprise one or more lasers (e.g., optical lasers, microwave sources, and/or the like). In various embodiments, each manipulation source 60 is configured to generate a manipulation signal having a respective characteristic wavelength in the microwave, infrared, visible, or ultraviolet portion of the electromagnetic spectrum. In various embodiments, the one or more manipulation sources 60 are configured to manipulate and/or cause a controlled quantum state evolution of one or more quantum objects within the confinement apparatus. For example, in an example embodiment, wherein the one or more manipulation sources 60 comprise one or more lasers, the lasers may provide one or more laser beams to quantum objects trapped within the confinement apparatus 300 within the one or more cryostats and/or vacuum chambers 40. For example, a manipulation source 60 generates a manipulation signal that is provided as an incoming signal to an appropriate array of meta material structures formed and/or disposed on the surface of the quantum object confinement apparatus 300. The incoming signal being incident on the array of meta material structures induces the meta material structures to emit an action signal directed toward and/or focused at a corresponding quantum object position of the quantum object confinement apparatus. For example, the manipulation sources 60 may be configured to generate one or more beams that may be used to initialize a quantum object into a state of a qubit space such that the quantum object may be used as a qubit of the confined quantum object quantum computer, perform one or more gates on one or more qubits of the confined quantum object quantum computer, read and/or determine a state of one or more qubits of the confined quantum object quantum computer, and/or the like.

In various embodiments, the quantum computer 1510 comprises an optics collection system configured to collect and/or detect photons generated by qubits (e.g., during reading procedures). The optics collection system may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to photons at an expected fluorescence wavelength of the qubits of the quantum computer. In various embodiments, the detectors may be in electronic communication with the controller 30 via one or more A/D converters 825 (see FIG. 8) and/or the like. For example, a quantum object being read and/or having its quantum state determined may emit an emitted signal, at least a portion of which is incident on a collection array of meta material structures formed and/or disposed on the surface of the quantum object confinement apparatus 300. The emitted signal being incident on the collection array of meta material structures induces the meta material structures to emit a detected signal directed toward and/or focused at collection optics of the quantum object confinement apparatus. The collection optics are configured to provide the collection signal to a photodetector.

In various embodiments, the quantum computer 1510 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 300, in an example embodiment.

In various embodiments, a computing entity 10 is configured to allow a user to provide input to the quantum computer 1510 (e.g., via a user interface of the computing entity 10) and receive, view, and/or the like output from the quantum computer 1510. The computing entity 10 may be in communication with the controller 30 of the quantum computer 1510 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the controller 30 can understand and/or implement.

In various embodiments, the controller 30 is configured to control the voltage sources 50, cryostat system and/or vacuum system controlling the temperature and pressure within the one or more cryostats and/or vacuum chambers 40, manipulation sources 60, and/or other systems controlling various environmental conditions (e.g., temperature, pressure, and/or the like) within the one or more cryostats and/or vacuum chambers 40 and/or configured to manipulate and/or cause a controlled evolution of quantum states of one or more quantum objects within the confinement apparatus. For example, the controller 30 may cause a controlled evolution of quantum states of one or more quantum objects within the confinement apparatus to execute a quantum circuit and/or algorithm. For example, the controller 30 may cause a reading procedure comprising coherent shelving to be performed, possibly as part of executing a quantum circuit and/or algorithm. In various embodiments, the quantum objects confined within the confinement apparatus are used as qubits of the quantum computer 1510.

Exemplary Controller

In various embodiments, a quantum object confinement apparatus 300 is incorporated into a system (e.g., a quantum computer 1510) comprising a controller 30. In various embodiments, the controller 30 is configured to control various elements of the system (e.g., quantum computer 1510). For example, the controller 30 may be configured to control the voltage sources 50, a cryostat system and/or vacuum system controlling the temperature and pressure within the one or more cryostats and/or vacuum chambers 40, manipulation sources 60, cooling system, and/or other systems controlling the environmental conditions (e.g., temperature, humidity, pressure, and/or the like) within the one or more cryostats and/or vacuum chambers 40 and/or configured to manipulate and/or cause a controlled evolution of quantum states of one or more quantum objects confined by the quantum object confinement apparatus 300. In various embodiments, the controller 30 may be configured to receive signals from one or more optics collection systems.

Figure 16:
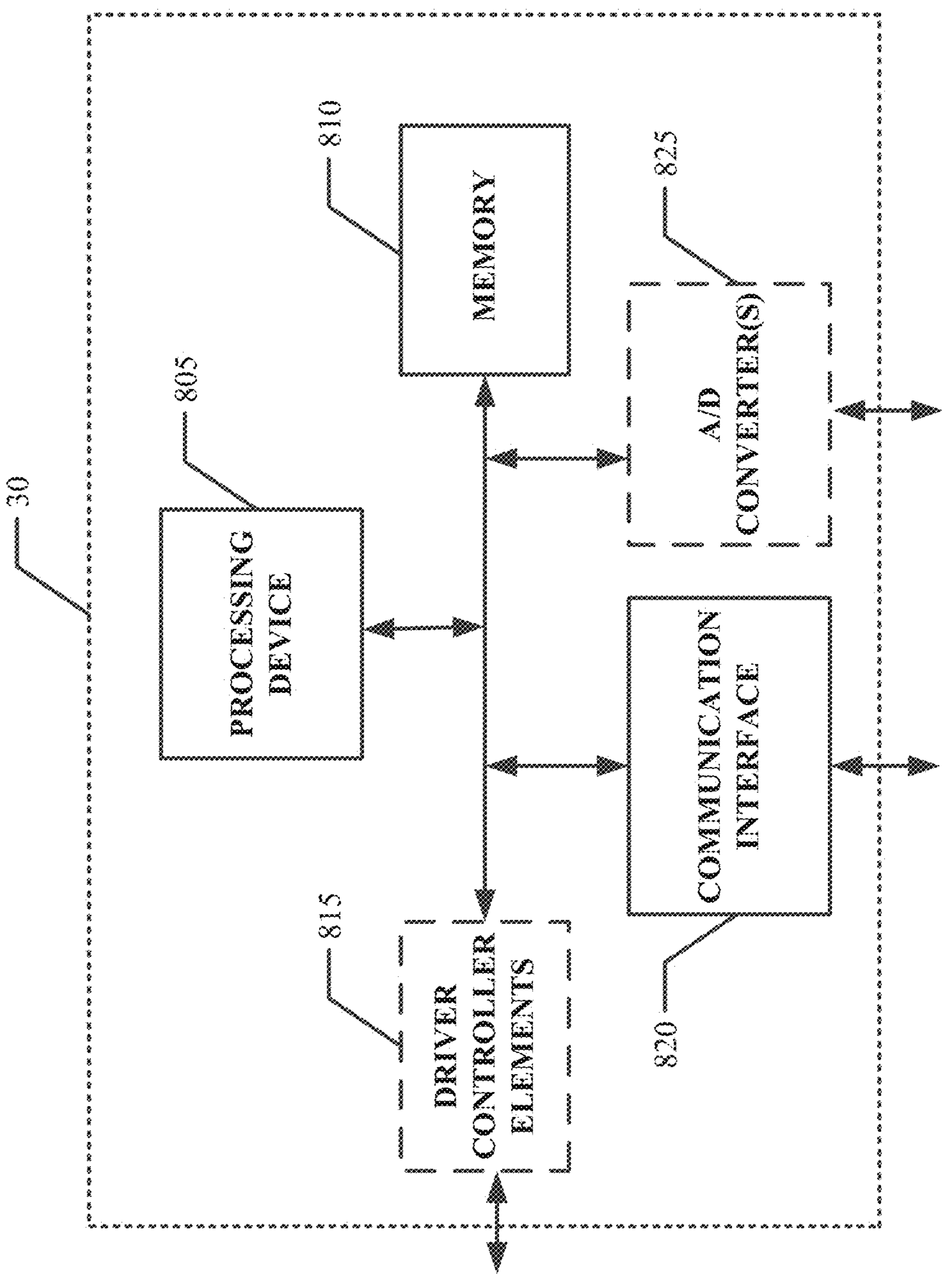
FIG. 16 is a schematic diagram of an example controller of a quantum computer configured to perform one or more deterministic reshaping and/or reordering functions, according to various embodiments.
Figure 17:
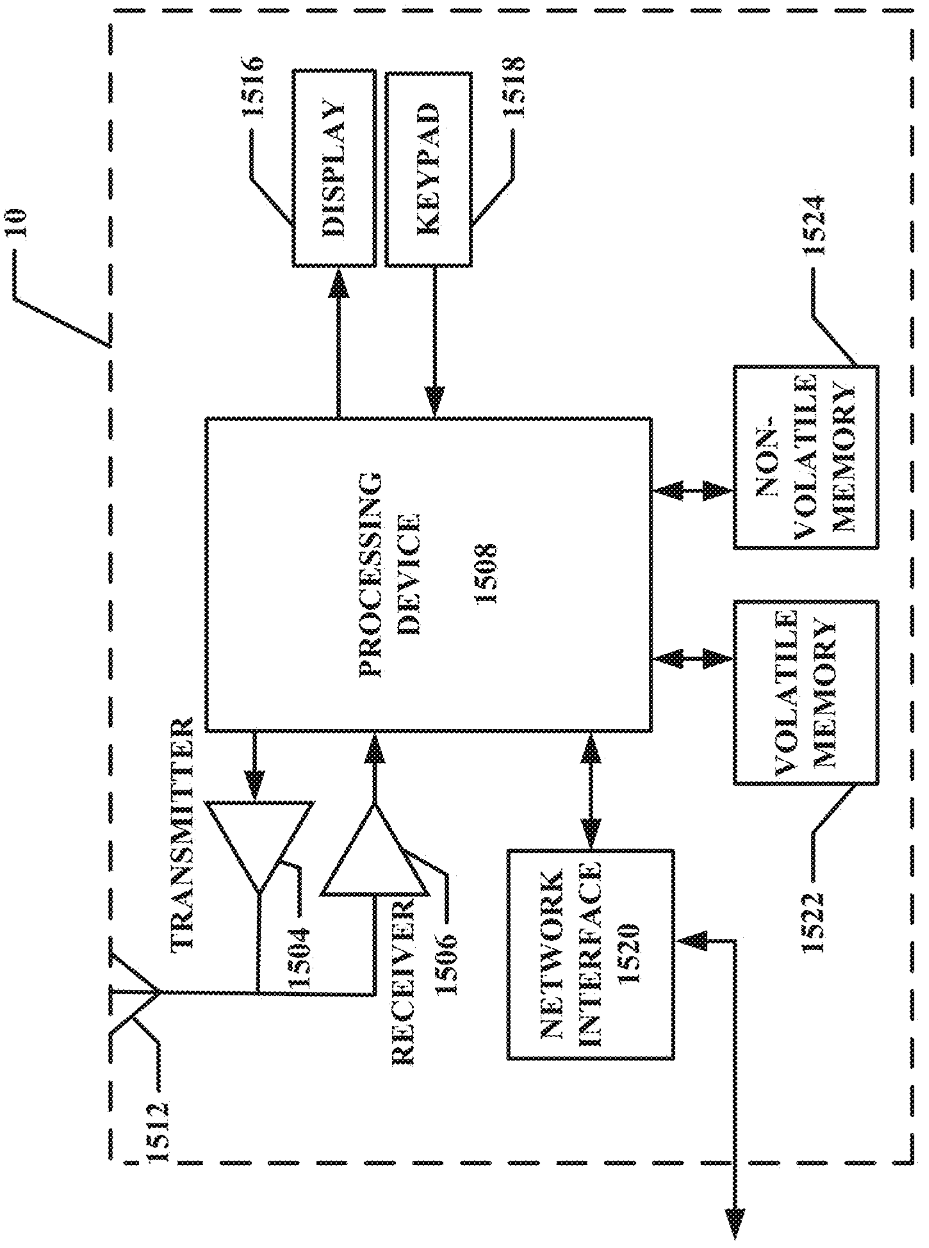
FIG. 17 is a schematic diagram of an example computing entity that may be used in accordance with an example embodiment.

As shown in FIG. 16, in various embodiments, the controller 30 may comprise various controller elements including processing elements 805, memory 810, driver controller elements 815, a communication interface 820, analog-digital converter elements 825, and/or the like. For example, the processing elements 805 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 805 of the controller 30 comprises a clock and/or is in communication with a clock.

For example, the memory 810 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 810 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized controller language(s), and/or the like), and/or the like. In an example embodiment, execution of at least a portion of the computer program code stored in the memory 810 (e.g., by a processing element 805) causes the controller 30 to perform one or more steps, operations, processes, procedures and/or the like described herein for providing manipulation signals to quantum object locations and/or collecting, detecting, capturing, and/or measuring indications of emitted signals emitted by quantum objects located at corresponding quantum object locations of the quantum object confinement apparatus 300.

In various embodiments, the driver controller elements 815 may include one or more drivers and/or controller elements each configured to control one or more drivers. In various embodiments, the driver controller elements 815 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 805). In various embodiments, the driver controller elements 815 may enable the controller 30 to operate a voltage sources 50, manipulation sources 60, cooling system, and/or the like. In various embodiments, the drivers may be laser drivers configured to operate one or manipulation sources 60 to generate manipulation signals; vacuum component drivers; drivers for controlling the flow of current and/or voltage applied to electrodes used for maintaining and/or controlling the trapping potential of the quantum object confinement apparatus 300 (and/or other drivers for providing driver action sequences to potential generating elements of the quantum object confinement apparatus); cryostat and/or vacuum system component drivers; cooling system drivers, and/or the like. In various embodiments, the controller 30 comprises means for communicating and/or receiving signals from one or more optical receiver components (e.g., photodetectors of the optics collection system). For example, the controller 30 may comprise one or more analog-digital converter elements 825 configured to receive signals from one or more optical receiver components (e.g., a photodetector of the optics collection system), calibration sensors, and/or the like.

In various embodiments, the controller 30 may comprise a communication interface 820 for interfacing and/or communicating with a computing entity 10. For example, the controller 30 may comprise a communication interface 820 for receiving executable instructions, command sets, and/or the like from the computing entity 10 and providing output received from the quantum computer 1510 (e.g., from an optical collection system) and/or the result of a processing the output to the computing entity 10. In various embodiments, the computing entity 10 and the controller 30 may communicate via a direct wired and/or wireless connection and/or via one or more wired and/or wireless networks 20.

In various embodiments, the controller 30 receives the signals from the any of the first detector 120 and/or the second detectors 720 as described above. In example embodiments, the controller 30 receives the signals from the any of the first detector 120 and/or the second detectors 720 the A/D converter(s) 825. In example embodiment, the controller 30 performs any processing on the received signal from the any of the first detector 120 and/or the second detectors 720. In example embodiments, the controller 30 determines whether the first detector 120 and/or the second detectors 720 perform simultaneous detection for quantum entanglement as previously described.

Example Computing Entity

FIG. 15 provides an illustrative schematic representative of an example computing entity 10 that can be used in conjunction with embodiments of the present invention. In various embodiments, a computing entity 10 is configured to allow a user to provide input to any of the quantum entanglement apparatus(s) (e.g., via a user interface of the computing entity 10) and receive, display, analyze, and/or the like output from the quantum entanglement apparatus(s). For example, the computing entity 10 may be used to set and/or adjust various parameters for various components of the quantum entanglement apparatus(s) such as modification component(s), filter(s), detector(s), etc.

As shown in FIG. 15, a computing entity 10 can include an antenna 1512, a transmitter 1504 (e.g., radio), a receiver 1506 (e.g., radio), and a processing element 1508 that provides signals to and receives signals from the transmitter 1504 and receiver 1506, respectively. The signals provided to and received from the transmitter 1504 and the receiver 1506, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 1516 and/or speaker/speaker driver coupled to a processing element 1508 and a touch screen, keyboard, mouse, and/or microphone coupled to a processing element 1508). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1518 (hard or soft), a touch display, voice/speech or motion interfaces, scanners, readers, or other input device. In embodiments including a keypad 1518, the keypad 1518 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1522 and/or non-volatile storage or memory 1524, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A quantum entanglement apparatus comprising:

a first collecting component, the first collecting component configured to cause, at least in part a first emitted photon emitted by a first quantum object to be provided to a first collection path;

a second collecting component, the second collecting component configured to cause, at least in part, a second emitted photon emitted by a second quantum object to be provided to a second collection path;

a beam splitter optically coupled to the first collection path and the second collection path so as to receive the first emitted photon via the first collection path and to receive the second emitted photon via the second collection path, the beam splitter comprising two output ports, and the beam splitter configured to:

combine the first emitted photon and the second emitted photon; and direct each of the first emitted photon and the second emitted photon to respective output ports of the two output ports of the beam splitter, wherein whether a respective photon exiting either of the two output ports of the beam splitter was emitted by the first quantum object or the second quantum object is indistinguishable, and wherein a first output port of the two output ports is configured to provide photons to a first optical path and a second output port of the two output ports is configured to provide photons to a second optical path;

the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer, wherein the quantum entanglement apparatus is configured to entangle the first quantum object and the second quantum object when the first detector and the second detector perform detection of respective photons simultaneously.

2. The quantum entanglement apparatus of claim 1, comprising:

a first waveguide optically coupled to a first input of the beam splitter, the first waveguide configured to convey the first emitted photon to the beam splitter; and a second waveguide optically coupled to a second input of the beam splitter, the second waveguide configured to convey the second emitted photon to the beam splitter.

3. The quantum entanglement apparatus of claim 2, comprising a first photonic integrated circuit disposed on a first side of a first quantum object confinement component confining the first quantum object and the second quantum object, the first photonic integrated circuit comprising one or more of a metasurface component, the beam splitter, the first polarizer, the second polarizer, the first detector, the second detector, the first waveguide, or the second waveguide.

4. The quantum entanglement apparatus of claim 1, comprising:

a first optical fiber optically coupled to a first input of the beam splitter, the first optical fiber configured to convey the first emitted photon to the beam splitter; and a second optical fiber optically coupled to a second input of the beam splitter, the second optical fiber configured to convey the second emitted photon to the beam splitter.

5. The quantum entanglement apparatus of claim 4, comprising a first photonic integrated circuit disposed on a first side of a first quantum object confinement component confining the first quantum object and the second quantum object, the first photonic integrated circuit comprising one or more of the beam splitter, the first polarizer, the second polarizer, the first detector, the second detector, the first optical fiber, or the second optical fiber.

6. The quantum entanglement apparatus of claim 5, wherein the first photonic integrated circuit further comprises a first collection component configured to collect the first emitted photon and a second collection component configured to collect the second emitted photon.

7. The quantum entanglement apparatus of claim 6, wherein the first collection component comprises at least one of a first refractive lens, a first diffractive lens, or a first metasurface and the second collection component comprises at least one of a second refractive lens, a second diffractive lens, or a second metasurface.

8. The quantum entanglement apparatus of claim 4, further comprising a first photonic integrated circuit disposed on a first side of a first quantum object confinement component, the first photonic integrated circuit comprising one or more of the beam splitter, the first polarizer, the second polarizer, the first optical fiber, or the second optical fiber, and wherein at least one of (a) at least one of the first detector and the second detector are disposed on the first photonic integrated circuit or (b) at least one of the first detector and the second detector are disposed adjacent to the first photonic integrated circuit.

9. The quantum entanglement apparatus of claim 1, comprising:

a first waveguide configured to convey the first emitted photon;

a first collection component optically coupled to the first waveguide, the first collection component comprises one or more of a first diffractive lens or a first metasurface configured to collect the first emitted photon;

a second waveguide configured to convey the second emitted photon; and a second collection component optically coupled to the second waveguide, the second collection component comprises one or more of a second diffractive lens or a second metasurface configured to collect the second emitted photon, wherein the first collecting component is one of the first collection component or a first reflecting component disposed on a first surface of a first quantum object confinement apparatus, and wherein the second collecting component is one of the second collection component or a second reflecting component disposed on the first surface of the first quantum object confinement apparatus.

10. The quantum entanglement apparatus of claim 9, comprising:

a first optical fiber optically coupled to the first waveguide and the beam splitter, the first optical fiber configured to convey the first emitted photon to the beam splitter; and a second optical fiber optically coupled to the second waveguide and the beam splitter, the second optical fiber configured to convey the second emitted photon to the beam splitter.

11. The quantum entanglement apparatus of claim 10, comprising:

a third optical fiber optically coupled to the beam splitter and the first detector, the third optical fiber defining at least a portion of the first optical path; and a fourth optical fiber coupled to the beam splitter and the second detector, the fourth optical fiber defining at least a portion of the second optical path.

12. The quantum entanglement apparatus of claim 11, comprising:

a first modification component configured to modify one or more of a shape, phase, polarization, amplitude, frequency, or a time delay of photons incident thereon, the first modification component disposed either as part of the first collection path or as part of the first optical path; and a second modification component configured to modify one or more of a shape, phase, polarization, amplitude, frequency, or a time delay of photons incident thereon, the second modification component disposed either as part of the second collection path or as part of the second optical path.

13. The quantum entanglement apparatus of claim 12, comprising a first photonic integrated circuit disposed on a first side of a first quantum object confinement component, the first photonic integrated circuit comprising one or more of the beam splitter, the first polarizer, the second polarizer, the first detector, the second detector, the first waveguide, the second waveguide, the first collection component, and the second collection component, the first optical fiber, the second optical fiber, the third optical fiber, the fourth optical fiber, the first modification component, or the second modification component.

14. The quantum entanglement apparatus of claim 1, wherein the first optical path comprises a first filter, wherein the first filter is at least one of a spatial filter or a frequency domain filter, and the second optical path comprises a second filter, wherein the second filter is at least one of a spatial filter or a frequency domain filter.

15. A quantum entanglement apparatus comprising:

a first reflecting component disposed on a first surface of a first quantum object confinement component, the first reflecting component configured to reflect a first emitted photon emitted by a first quantum object;

a second reflecting component disposed on the first surface of the first quantum object confinement component, the second reflecting component configured to reflect a second emitted photon emitted by a second quantum object;

a first collection component configured to collect the first emitted photon;

a first modification component configured to modify one or more of a shape, phase, polarization, amplitude, frequency, and/or a time delay of the first emitted photon;

a second collection component configured to collect the second emitted photon;

a second modification component configured to modify one or more of a shape, phase, polarization, amplitude, frequency, and/or a time delay of the second emitted photon, a beam splitter comprising two output ports, the beam splitter configured to:

combine the first emitted photon and the second emitted photon; and direct each of the first emitted photon and the second emitted photon to respective output ports of the two output ports of the beam splitter, a first ouput port of the two output ports is configured to provide photons to a first detector via a first optical path and a second output port of the two output ports is configured to provide photons to a second detector via a second optical path, wherein whether a respective photon exiting either of the two output ports of the beam splitter was emitted by the first quantum object or the second quantum object is indistinguishable, and wherein the quantum entanglement apparatus is configured to entangle the first quantum object and the second quantum object when the first detector detects photons traversing the first optical path and the second detector detects photons traversing the second optical path simultaneously.

16. The quantum entanglement apparatus of claim 15, wherein the quantum entanglement apparatus further comprises:

the first optical path comprising a first polarizer, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer.

17. The quantum entanglement apparatus of claim 16, comprising:

a first waveguide or optical fiber configured to convey the first emitted photon to the beam splitter; and a second waveguide or optical fiber configured to convey the second emitted photon to the beam splitter.

18. The quantum entanglement apparatus of claim 17, comprising:

a third waveguide or optical fiber defining at least a portion of the first optical path; and a fourth waveguide or optical fiber defining at least a portion of the second optical path.

19. The quantum entanglement apparatus of claim 18, wherein the first polarizer is coupled to the third waveguide or optical fiber and the second polarizer is coupled to the fourth waveguide or optical fiber.

20. The quantum entanglement apparatus of claim 18, wherein the first collection component is optically coupled to the first waveguide or optical fiber, and the second collection component is optically coupled to the second waveguide or optical fiber.

21. The quantum entanglement apparatus of claim 18, wherein the first collection component is integral to the first waveguide or optical fiber, and the second collection component is integral to the second waveguide or optical fiber.

22. The quantum entanglement apparatus of claim 18 further comprising a first photonic integrated circuit disposed on the first side of the first quantum object confinement component, the first photonic integrated circuit comprising one or more of the beam splitter, the first polarizer, the second polarizer, the first detector, the second detector, the first waveguide or optical fiber, the second waveguide or optical fiber, the third waveguide or optical fiber, the fourth waveguide or optical fiber, the first collection component, the second collection component, the first modification component, or the second modification component.

23. A quantum entanglement apparatus comprising:

a first quantum object confinement component configured to confine a first quantum object;

a second quantum object confinement component configured to confine a second quantum object;

a first collection component configured to collect a first emitted photon emitted by the first quantum object;

a first modification component configured to modify one or more of a shape, phase, polarization, amplitude, frequency, and/or a time delay of the first emitted photon;

a second collection component configured to collect a second emitted photon emitted by the second quantum object;

a second modification component configured to modify one or more of a shape, phase, polarization, amplitude, frequency, and/or a time delay of the second emitted photon;

a beam splitter comprising two output ports and configured to:

combine the first emitted photon and the second emitted photon; and direct each of the first emitted photon and the second emitted photon to respective output ports of the two output ports of the beam splitter, wherein whether a respective photon exiting either of the two output ports of the beam splitter was emitted by the first quantum object or the second quantum object is indistinguishable, and wherein a first output port of the two output ports is configured to provide photons to a first optical path and a second output port of the two output ports is configured to provide photons to a second optical path;

the first optical path comprising a first polarizer and a first detector, wherein the first polarizer is configured to receive photons traversing the first optical path and transmit or reflect the photons traversing the first optical path based on respective photon polarizations of the photons traversing the first optical path and the first detector is configured to detect photons traversing the first optical path and transmitted by the first polarizer; and the second optical path comprising a second polarizer and a second detector, wherein the second polarizer is configured to receive photons traversing the second optical path and transmit or reflect the photons traversing the second optical path based on respective polarizations of the photons traversing the second optical path and the second detector is configured to detect photons traversing the second optical path and transmitted by the first polarizer, wherein the quantum entanglement apparatus is configured to entangle the first quantum object and the second quantum object when the first detector detects photons traversing the first optical path and the second detector detects photons traversing the second optical path simultaneously.

* * * * *